US011822011B2

(12) United States Patent
Chen et al.

(10) Patent No.: US 11,822,011 B2
(45) Date of Patent: *Nov. 21, 2023

(54) MIRRORS TO EXTEND SENSOR FIELD OF VIEW IN SELF-DRIVING VEHICLES

(71) Applicant: Waymo LLC, Mountain View, CA (US)

(72) Inventors: Mingcheng Chen, Sunnyvale, CA (US); Benjamin Pitzer, East Palo Alto, CA (US); Pierre-Yves Droz, Los Altos, CA (US); William Grossman, East Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/843,292

(22) Filed: Jun. 17, 2022

(65) Prior Publication Data
US 2022/0317254 A1    Oct. 6, 2022

Related U.S. Application Data

(63) Continuation of application No. 16/396,176, filed on Apr. 26, 2019, now Pat. No. 11,391,820.

(51) Int. Cl.
*G01S 7/481* (2006.01)
*G05D 1/02* (2020.01)
(Continued)

(52) U.S. Cl.
CPC ............ *G01S 7/4811* (2013.01); *B60R 1/06* (2013.01); *B60R 1/12* (2013.01); *B60W 10/04* (2013.01);
(Continued)

(58) Field of Classification Search
CPC .......... G01S 7/4811; G01S 7/03; G01S 17/87; G01S 17/931; G01S 13/862;
(Continued)

(56) References Cited

U.S. PATENT DOCUMENTS 4,825,062 A    4/1989  Rather et al.
5,610,815 A    3/1997  Gudat et al.
(Continued)

FOREIGN PATENT DOCUMENTS

CN    105122167 A    12/2015
CN    107943016 A    4/2018
(Continued)

OTHER PUBLICATIONS

The Extended European Search Report for European Patent Application No. 20793934.9, dated Nov. 30, 2022, 7 Pages.
(Continued)

*Primary Examiner* — Richard M Camby
(74) *Attorney, Agent, or Firm* — Botus Churchill IP Law LLP

(57) ABSTRACT

The technology relates to enhancing or extending the field of view of sensors for vehicles configured to operate in an autonomous driving mode. One or more mirrors are used to reflect or redirect beams emitted from onboard sensors that would otherwise be wasted, for instance due to obstruction by a portion of the vehicle or because they are emitted at high pitch angles to the side. The mirrors are also used to redirect incoming beams from the external environment toward one or more of the onboard sensors. Using mirrors for such redirection can reduce or eliminate blind spots around the vehicle. A calibration system may be employed to account for mirror movement due to vibration or wind drag. Each mirror may be a front surface mirror. The mirrors
(Continued)

may be positioned on the vehicle body, on a faring, or extending from a sensor housing on the vehicle.

20 Claims, 24 Drawing Sheets

(51) Int. Cl.
| | |
|---|---|
| *G01S 7/03* | (2006.01) |
| *B60W 10/04* | (2006.01) |
| *B60W 10/20* | (2006.01) |
| *B60W 10/18* | (2012.01) |
| *B60W 30/18* | (2012.01) |
| *B60R 1/06* | (2006.01) |
| *B60R 1/12* | (2006.01) |
| *G05D 1/00* | (2006.01) |

(52) U.S. Cl.
CPC ............ *B60W 10/18* (2013.01); *B60W 10/20* (2013.01); *B60W 30/18* (2013.01); *G01S 7/03* (2013.01); *G05D 1/0088* (2013.01); *G05D 1/024* (2013.01); *G05D 1/0242* (2013.01); *G05D 1/0246* (2013.01); *G05D 1/0257* (2013.01); *B60R 2001/1284* (2013.01); *B60W 2300/126* (2013.01); *B60W 2400/00* (2013.01); *B60W 2420/52* (2013.01); *B60W 2710/08* (2013.01); *B60W 2710/20* (2013.01); *B60W 2720/106* (2013.01); *G05D 2201/0213* (2013.01)

(58) Field of Classification Search
CPC .... G01S 13/865; G01S 13/931; G01S 13/867; G01S 17/86; G01S 2013/9315; G01S 2013/9323; G01S 2013/93273; B60R 1/06; B60R 1/12; B60R 2001/1284; B60R 2011/004; B60R 11/04; B60R 11/00; B60R 16/0231; B60R 2001/1223; B60R 2300/802; B60W 10/04; B60W 10/18; B60W 10/20; B60W 30/18; B60W 2300/126; B60W 2400/00; B60W 2420/52; B60W 2710/18; B60W 2710/20; B60W 2720/106; G05D 1/0088; G05D 1/024; G05D 1/0242; G05D 1/0246; G05D 1/0257; G05D 2201/0213
See application file for complete search history.

(56) References Cited

U.S. PATENT DOCUMENTS

| | | | |
|---|---|---|---|
| 6,498,620 | B2 | 12/2002 | Schofield et al. |
| 7,211,980 | B1 | 5/2007 | Bruemmer et al. |
| 8,718,861 | B1 | 5/2014 | Montemerlo et al. |
| 8,849,494 | B1 | 9/2014 | Herbach et al. |
| 9,315,151 | B2 | 4/2016 | Taylor |
| 2004/0004541 | A1 | 1/2004 | Hong |
| 2007/0139174 | A1 | 6/2007 | Perkes |
| 2011/0040482 | A1 | 2/2011 | Brimble et al. |
| 2015/0103327 | A1 | 4/2015 | Hartjes |
| 2016/0170412 | A1* | 6/2016 | Yamamoto ........... G05D 1/0088 701/23 |
| 2018/0083363 | A1 | 3/2018 | Izadian |
| 2018/0167551 | A1 | 6/2018 | Koravadi |
| 2018/0267558 | A1 | 9/2018 | Tiwari et al. |
| 2018/0284286 | A1 | 10/2018 | Eichenholz et al. |
| 2018/0284780 | A1* | 10/2018 | McWhirter ........... G01S 7/4861 |
| 2018/0341103 | A1 | 11/2018 | Dussan et al. |

FOREIGN PATENT DOCUMENTS

| | | |
|---|---|---|
| CN | 107985204 A | 5/2018 |
| CN | 108263287 A | 7/2018 |
| EP | 1859993 A1 | 11/2007 |
| JP | H08282379 A | 10/1996 |
| JP | 2013131925 A | 7/2013 |
| WO | 2013144998 A1 | 10/2013 |

OTHER PUBLICATIONS

International Search Report and Written Opinion for Application No. PCT/US2020/029811 dated Jul. 31, 2020.
Hecht, Jeff , "Lidar for Self-Driving Cars", Optics & Photonics News, Jan. 2018, pp. 28-33.
Teschler, Lee , "Super-Sophisticated MEMS Mirrors Could Bring Super-Capable Lidar", The Robot Report, Jan. 29, 2018, pp. 1-8.
Wang , et al., "Micromirror Based Optical Phased Array for Wide-Angle Beamsteering", University of California, 2017, pp. 897-900.
The First Office Action for Chinese Patent Application No. 202010337617.8, dated May 26, 2023, 21 Pages.

* cited by examiner

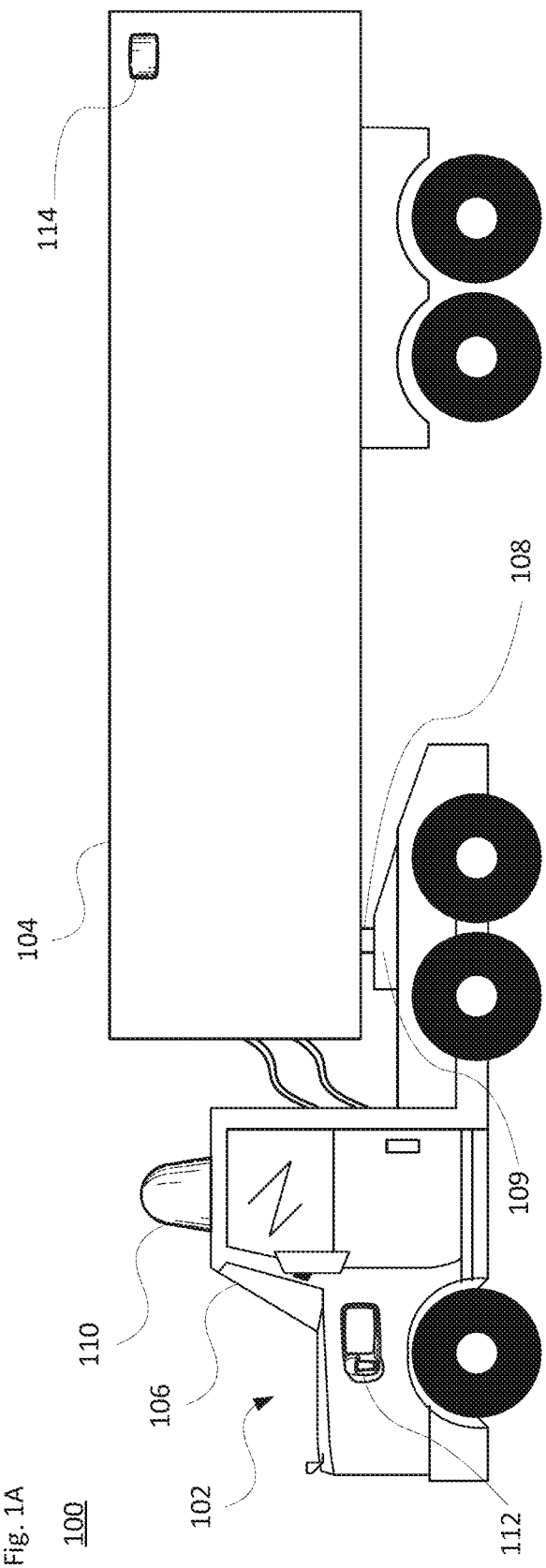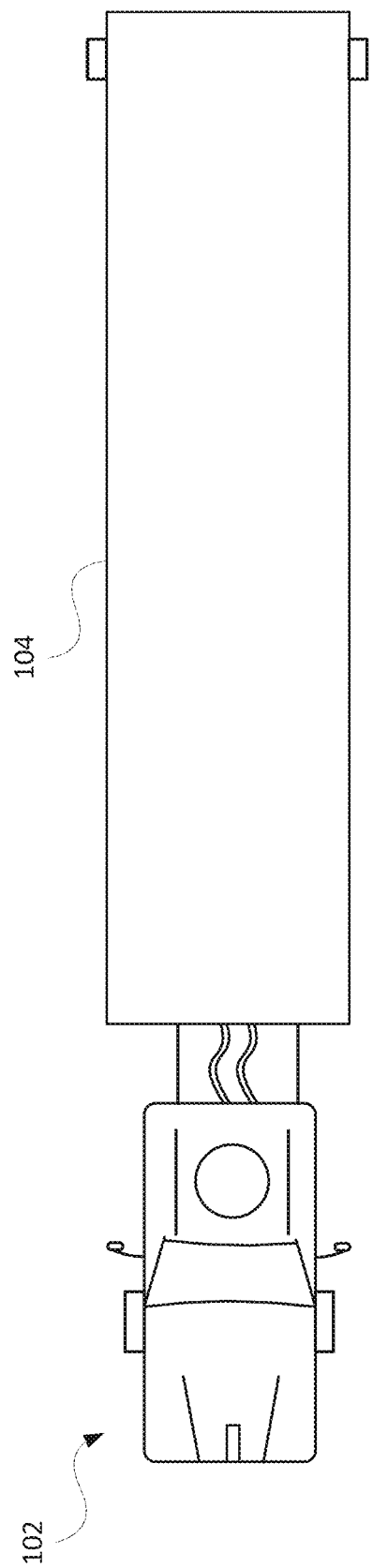

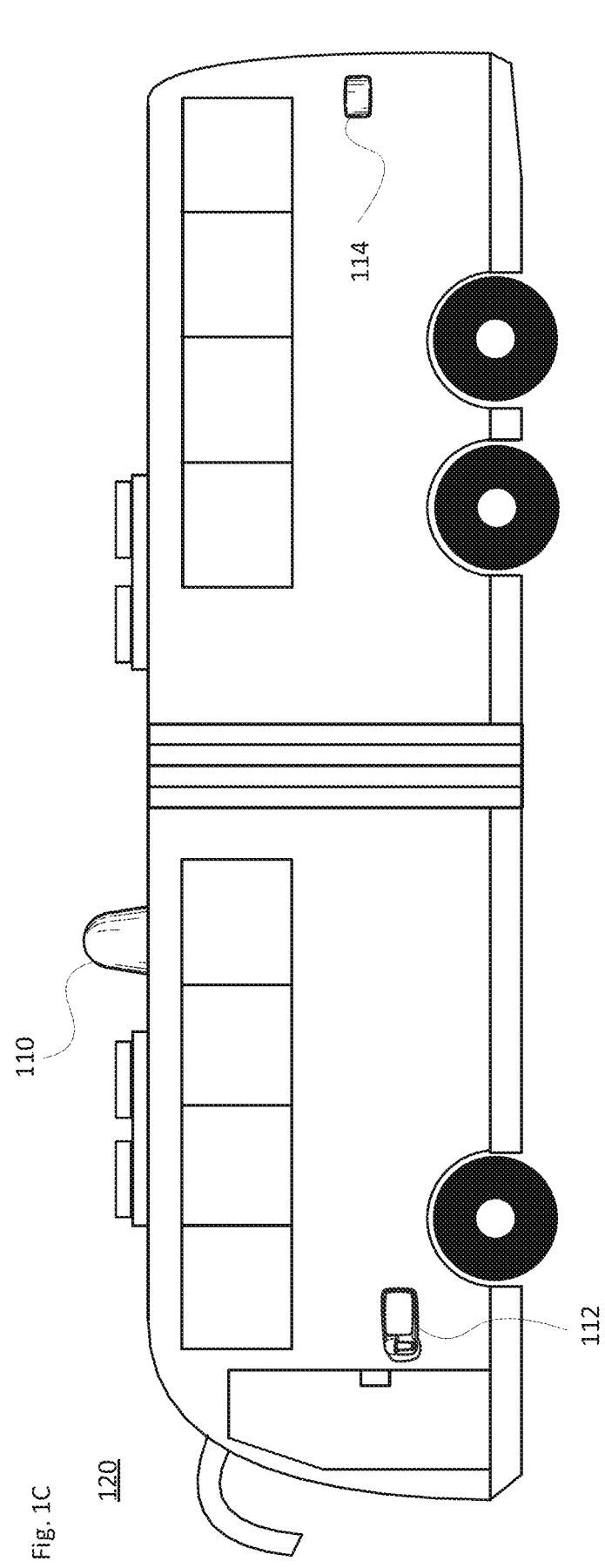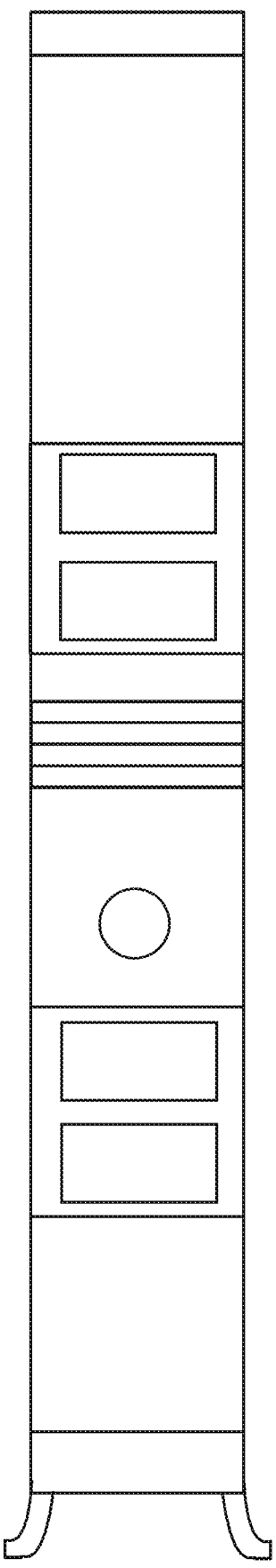

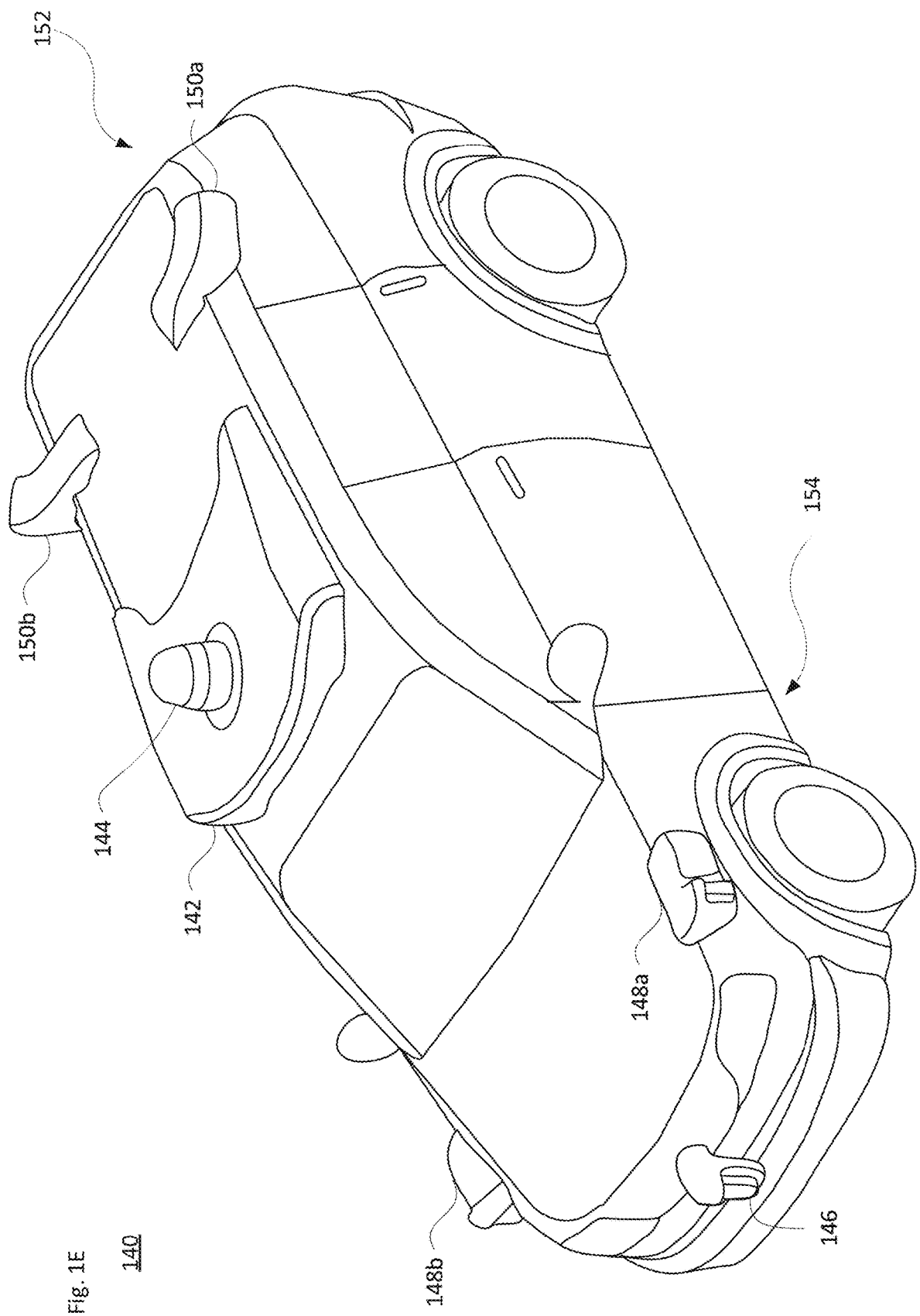

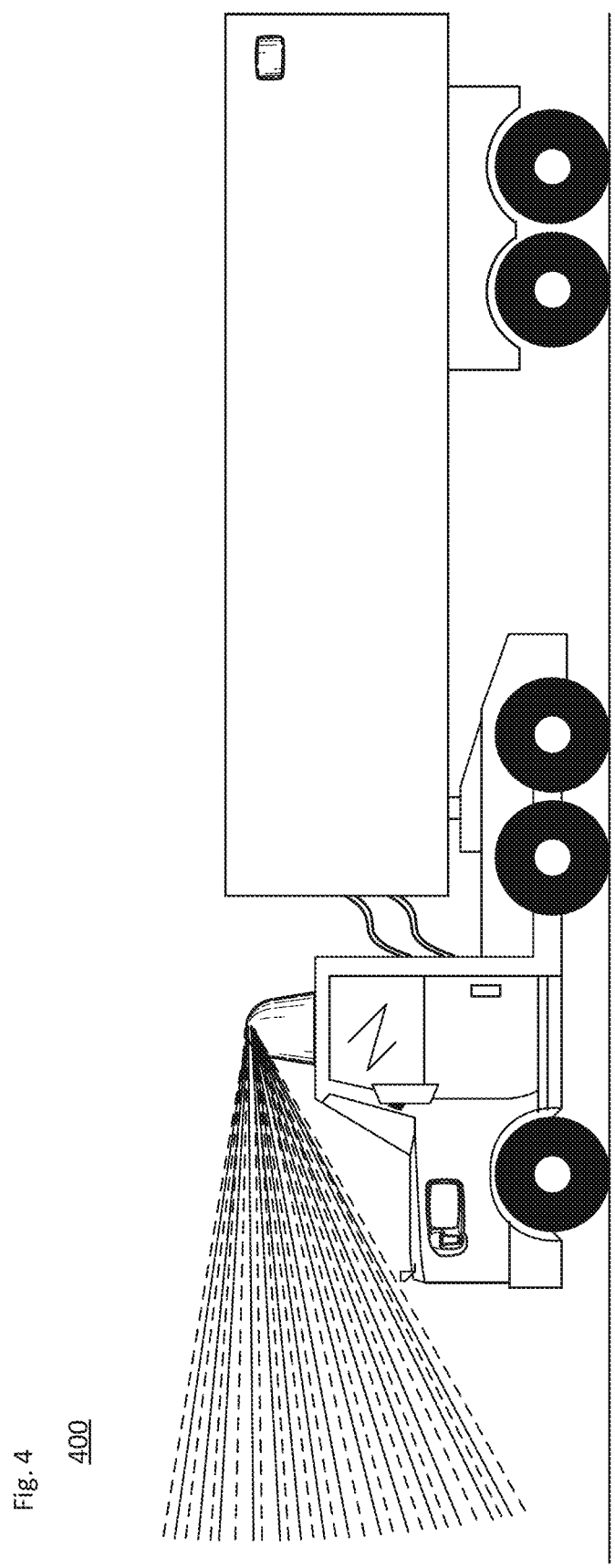

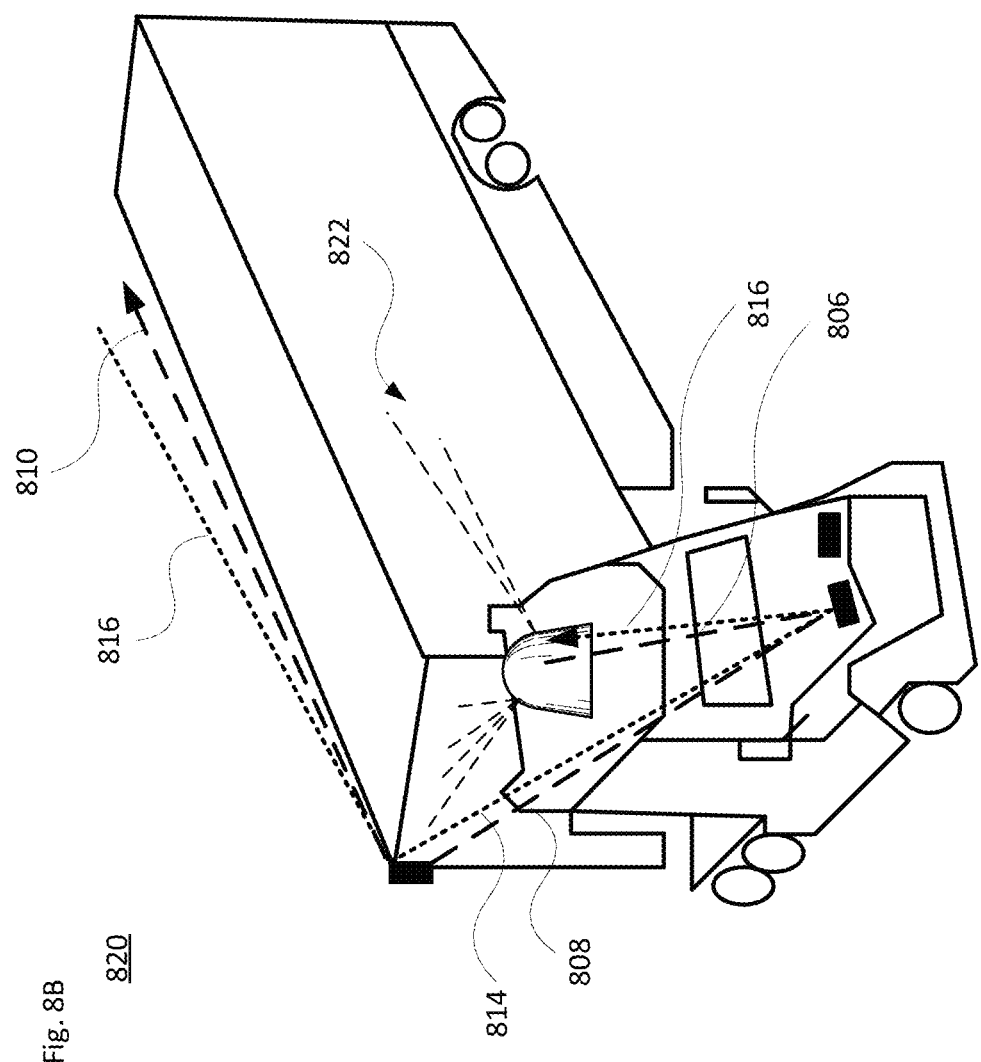

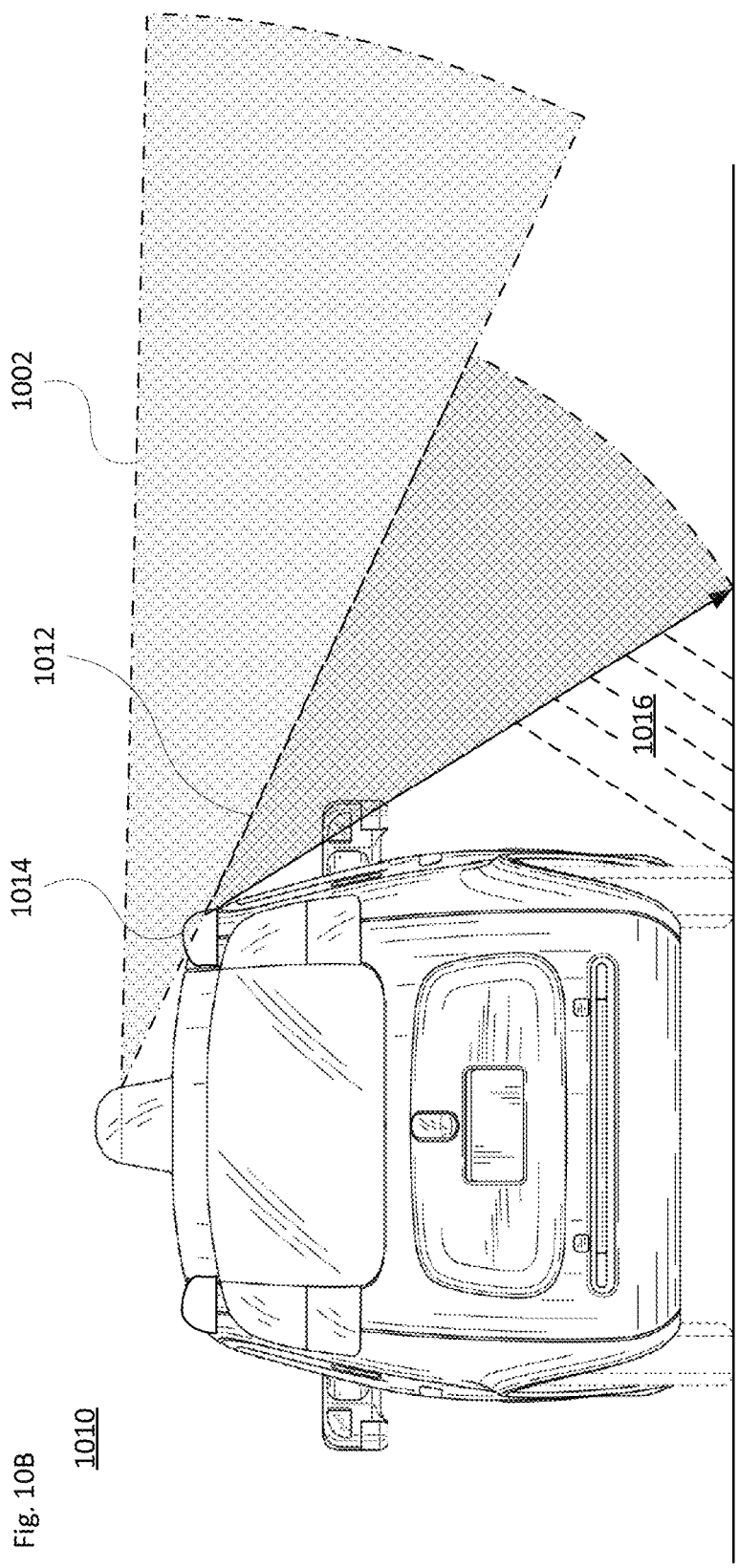

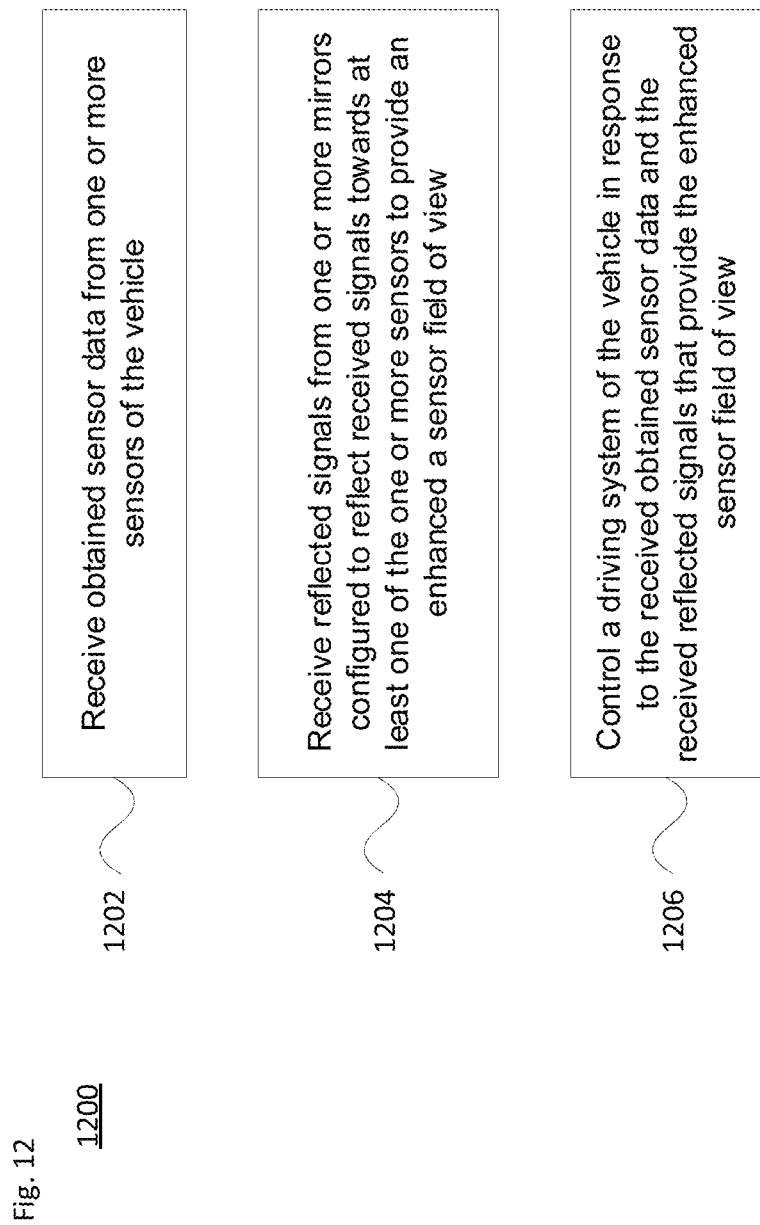

MIRRORS TO EXTEND SENSOR FIELD OF VIEW IN SELF-DRIVING VEHICLES

CROSS-REFERENCE TO RELATED APPLICATIONS

This application is a continuation of U.S. patent application Ser. No. 16/396,176, filed Apr. 26, 2019, the entire disclosure of which is incorporated herein by reference.

BACKGROUND

Autonomous vehicles, such as vehicles that do not require a human driver, can be used to aid in the transport of trailered (e.g., towed) cargo, such as freight, livestock or other items from one location to another. Other types of articulated vehicles may also transport cargo or passengers. Such vehicles may operate in a fully autonomous mode without any in-vehicle passenger input or a partially autonomous mode where a person may provide some driving input. One or more sensors can be used to detect nearby objects in the environment, and the vehicle may use information from the sensors when driving in an autonomous mode. Depending on the size, shape and orientation of the vehicle, there may be one or more blind spots around the vehicle. Blind spots may be reduced by adding more sensors. However, each added sensor results in increased cost and may increase computer processing power requirements. Also, this approach may not be physically feasible in certain instances.

BRIEF SUMMARY

All vehicles have blind spots that may impair the field of view (FOV) of the driver or on-board computer system in the case of a vehicle capable of operating in a self-driving mode. Large-sized vehicles such as cargo vehicles, buses and construction equipment can encounter particular challenges compared to smaller passenger vehicles such as sedans or vans. For instance, the trailer of a cargo truck may obstruct the FOV of sensors mounted on the truck's tractor, especially during a turning maneuver. And due to the size of the truck, the blind spot(s) may be significantly larger than those of a smaller passenger vehicle.

Careful sensor placement can help to reduce blind spots. Employing additional sensors on the vehicle can further minimize blind spots. However, adding sensors can increase system cost as well as processing complexity, for example from a sensor fusion perspective. Regardless of the number or type of added sensors, some areas around the vehicle may be obscured or have reduced visibility due to physical limitations on where the sensors can be placed.

The technology described herein employs one or more reflective components (mirrors) located external to the sensor to increase the sensor's effective FOV. Such mirrors can reflect or redirect beams that would otherwise be wasted. By way of example, the main lidar sensor on the roof of the tractor of a cargo vehicle may rotate to provide a 360° FOV. As it rotates through various yaw positions, multiple beams are emitted across a set of pitches (e.g., between +2° to −18°). Some beams may be wasted due to obstruction by the trailer. Other beams may be wasted because they are emitted at high pitch angles to the side. Using mirrors to redirect these and other beams emitted from the lidar sensor can help address the blind spot issue and provide enhanced visibility around external obstructions, e.g., a large truck between the vehicle and another object. Depending on the configuration and materials, the mirrors may also be employed with other types of sensors (e.g., cameras and radar).

According to one aspect of the technology, a vehicle is configured to operate in an autonomous driving mode. The vehicle comprises a driving system, a perception system, one or more mirrors and a control system. The driving system includes a steering subsystem, an acceleration subsystem and a deceleration subsystem to control driving of the vehicle in the autonomous driving mode. The perception system includes one or more sensors configured to detect objects in an environment surrounding the vehicle based on obtained sensor data. Each of the sensors is disposed in a respective housing positioned along the vehicle. The one or more mirrors are remote from the respective housings of the one or more sensors. The one or more mirrors are configured to reflect received signals towards at least one of the one or more sensors to enhance a sensor field of view. The control system is operatively connected to at least the driving system and the perception system. The control system has one or more computer processors configured to receive sensor data corresponding to the enhanced sensor field of view from the perception system and to direct the driving system when operating in the autonomous driving mode based on the sensor data received from the perception system.

In one example, the vehicle further comprises a calibration system configured to detect an amount of vibration for the one or more mirrors and to provide information regarding the detected amount of vibration to the perception system or the control system during processing of the obtained sensor data. The calibration system may be part of the perception system or the control system.

In another example, the one or more mirrors are further configured to reflect emitted signals from the one or more sensors to the environment. Here, the emitted signals may include laser light or radio waves, and the received signals may be at least one of laser light, radio waves, optical imagery or infrared imagery.

In another example, the one or more mirrors are planar front surface mirrors. In a further example, the one or more mirrors are rigidly affixed to a surface of the vehicle. In yet another example, a given one of the one or more mirrors extends externally from the respective housing of a corresponding one of the one or more sensors.

In a further example, the one or more mirrors are configured to deploy away from a surface of the vehicle during operation of the vehicle in the autonomous driving mode. Deployment may include the one or more mirrors popping out from a surface of the vehicle. The vehicle may include a servo mechanism configured to control deployment of the one or more mirrors. Here, the servo mechanism may be further configured to steer the one or more mirrors. Alternatively, the servo mechanism is further configured to dampen vibration of the one or more mirrors.

In another example, the one or more mirrors includes a first mirror and a second mirror. According to one scenario, the first and second mirrors may be non-coplanar.

The vehicle may be a truck having a tractor unit, with the tractor unit including a coupling system to pivotally coupled to a trailer. In this case, the one or more mirrors may be disposed along respective surfaces of the tractor unit. Alternatively and/or additionally, the vehicle includes the trailer and at least one of the one or more mirrors is disposed along the trailer.

According to another aspect, a method of operating a vehicle in an autonomous driving mode comprises receiving, by one or more processors of a control system of the vehicle, obtained sensor data from one or more sensors configured to detect objects in an environment surrounding the vehicle, each of the one or more sensors being disposed in a respective housing positioned along the vehicle and having a respective field of view; receiving, by the one or more processors, reflected signals from one or more mirrors remote from the respective housings of the one or more sensors, the one or more mirrors being configured to reflect received signals towards at least one of the one or more sensors to provide an enhanced a sensor field of view; and controlling, by the one or more processors, a driving system of the vehicle when operating in the autonomous driving mode, in response to the received obtained sensor data and the received reflected signals that provide the enhanced sensor field of view.

The method may further comprise controlling operation of at least one of the one or more mirrors by: deploying the at least one mirror away from a surface of the vehicle during operation of the vehicle in the autonomous driving mode; steering the at least one mirror; dampening vibration of the at least one mirror; and/or retracting the at least one mirror onto or into the vehicle when not in use. The method may alternatively or additionally further include calibrating the one or more mirrors prior to or during operation in the autonomous driving mode.

BRIEF DESCRIPTION OF THE DRAWINGS

FIGS. 1A-B illustrate an example tractor-trailer arrangement for use with aspects of the technology.

FIGS. 1C-D illustrate an example articulated bus arrangement for use with aspects of the technology.

FIG. 1E illustrates an example passenger vehicle for use with aspects of the technology.

FIG. 4 illustrates a sensor scanning example in accordance with aspects of the disclosure.

FIGS. 8A-B illustrate a further field of view scenario in accordance with aspects of the disclosure.

FIGS. 10A-B illustrate an enhanced field of view scenario in accordance with aspects of the disclosure.

FIG. 12 illustrates a method of operating a vehicle in an autonomous driving mode in response to an enhanced field of view, in accordance with aspects of the disclosure.

DETAILED DESCRIPTION

Overview

Figure 2A:
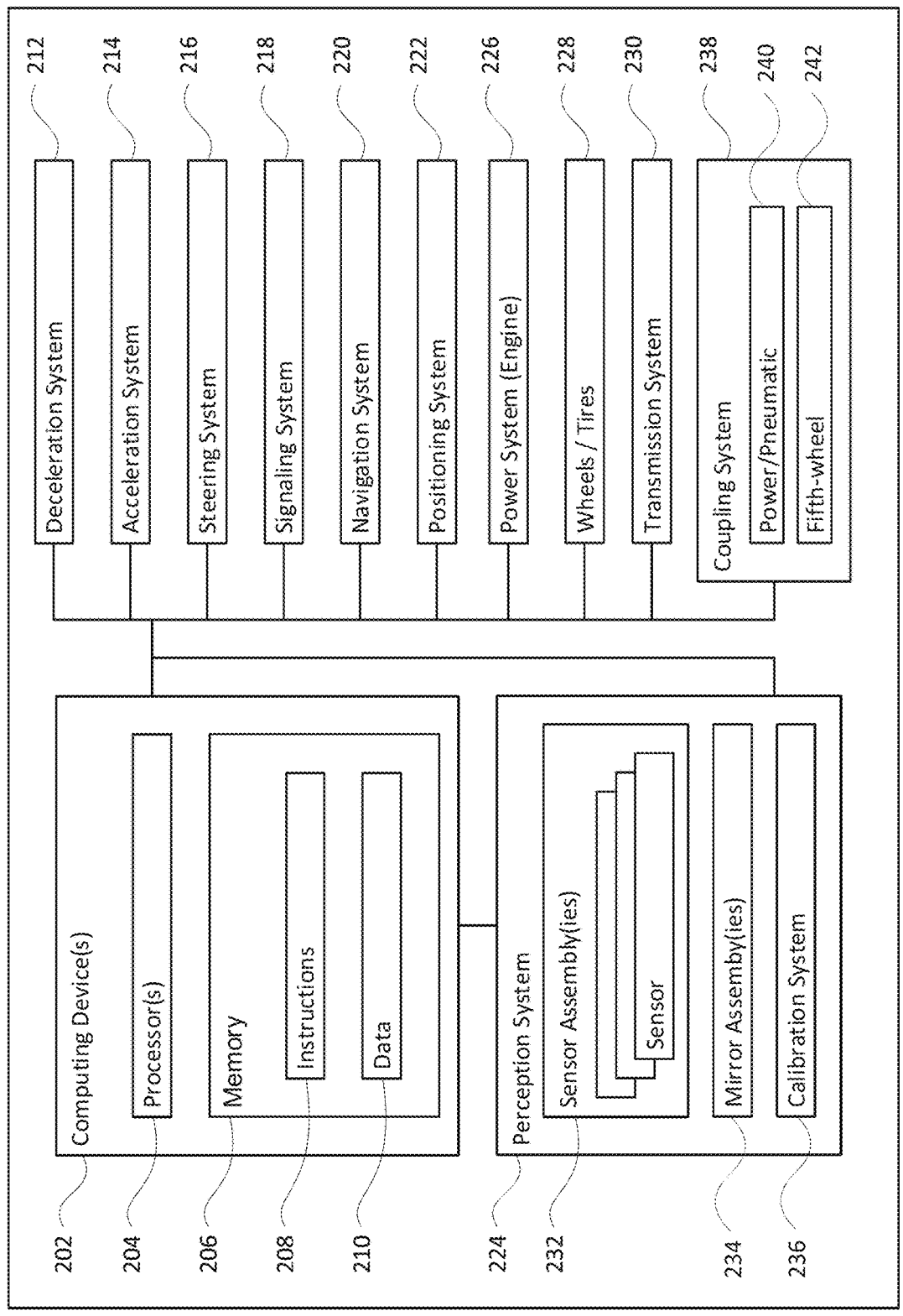
FIG. 2A illustrates a system diagram of an autonomous vehicle control system in accordance with aspects of the disclosure.

The technology relates to fully autonomous or semi-autonomous vehicles, including cargo vehicles (e.g., tractor-trailers) and other articulated vehicles (e.g., buses), construction or farm vehicles, as well as passenger vehicles (e.g., sedans and minivans). On-board sensors, such as lidar sensors, are used to detect objects in the vehicle's environment. These sensors may also detect the real-time pose of the vehicle. Reflective components (mirrors) are employed to reduce sensor blind spots and enhance sensor FOV. These and other aspects are discussed in detail below.

FIGS. 1A-B illustrate an example vehicle 100, such as a tractor-trailer truck. The truck may include, e.g., a single, double or triple trailer, or may be another medium or heavy duty truck such as in commercial weight classes 4 through 8. As shown, the truck includes a tractor unit 102 and a single cargo unit or trailer 104. The trailer 104 may be fully enclosed, open such as a flat bed, or partially open depending on the type of cargo to be transported. The tractor unit 102 includes the engine and steering systems (not shown) and a cab 106 for a driver and any passengers. In a fully autonomous arrangement, the cab 106 may not be equipped with seats or manual driving components, since no person may be necessary.

The trailer 104 includes a hitching point, known as a kingpin, 108. The kingpin 108 is typically formed as a solid steel shaft, which is configured to pivotally attach to the tractor unit 102. In particular, the kingpin 108 attaches to a trailer coupling 109, known as a fifth-wheel, that is mounted rearward of the cab. For a double or triple tractor-trailer, the second and/or third trailers may have simple hitch connections to the leading trailer. Or, alternatively, according to one aspect of the disclosure, each trailer may have its own kingpin. In this case, at least the first and second trailers could include a fifth-wheel type structure arranged to couple to the next trailer.

As shown, the tractor may have one or more sensor units 110, 112 disposed therealong. For instance, one or more sensor units 110 may be disposed on a roof or top portion of the cab 106, and one or more side sensor units 112 may be disposed on left and/or right sides of the cab 106. Sensor units may also be located along other regions of the cab 106, such as along the front bumper or hood area, in the rear of the cab, adjacent to the fifth-wheel, underneath the chassis, etc. The trailer 104 may also have one or more sensor units 114 disposed therealong, for instance along a side panel, front, rear, roof and/or undercarriage of the trailer 104. FIGS. 1C-D illustrate an example of another type of articulated vehicle 120, such as an articulated bus. As with the tractor-trailer 100, the articulated bus 120 may include one or more sensor units disposed along different areas of the vehicle.

FIG. 1E is a perspective view of an exemplary passenger vehicle 140. Similar to vehicles 100 and 120, the vehicle 140 includes various sensors for obtaining information about the vehicle's external environment. For instance, a roof-top housing 142 and dome arrangement 144 may include a lidar sensor as well as various cameras and/or radar units. Housing 146, located at the front end of vehicle 140, and housings 148a, 148b on the driver's and passenger's sides of the vehicle may each store a lidar or other sensor. For example, each housing 148 may be located in front of the driver's side door. Vehicle 140 also includes housings 150a, 150b for radar units, lidar and/or cameras also located towards the rear roof portion of the vehicle. Additional lidar, radar units and/or cameras (not shown) may be located at other places along the vehicle 140. For instance, arrow 152 indicates that a sensor unit may be positioned along the read of the vehicle 140, such as on or adjacent to the bumper. And arrow 154 indicates that another sensor unit may be positioned on the undercarriage of the vehicle.

By way of example, as discussed further below each sensor unit may include one or more sensors within one housing, such as lidar, radar, camera (e.g., optical or infrared), acoustical (e.g., microphone or sonar-type sensor), inertial (e.g., accelerometer, gyroscope, etc.) or other sensors.

Example Systems

FIG. 2A illustrates a block diagram 200 with various components and systems of a vehicle, such as a truck, farm equipment or construction equipment, configured to operate in a fully or semi-autonomous mode of operation. By way of example, there are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive without assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as "autonomous" driving modes. Thus, reference to an autonomous driving mode includes both partial and full autonomy.

As shown in the block diagram of FIG. 2A, the vehicle includes a control system of one or more computing devices, such as computing devices 202 containing one or more processors 204, memory 206 and other components typically present in general purpose computing devices. The control system may constitute an electronic control unit (ECU) of a tractor unit. The memory 206 stores information accessible by the one or more processors 204, including instructions 208 and data 210 that may be executed or otherwise used by the processor 204. The memory 206 may be of any type capable of storing information accessible by the processor, including a computing device-readable medium. The memory is a non-transitory medium such as a hard drive, memory card, optical disk, solid state device, tape memory, or the like. Systems may include different combinations of the foregoing, whereby different portions of the instructions and data are stored on different types of media.

The instructions 208 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. The data 210 may be retrieved, stored or modified by one or more processors 204 in accordance with the instructions 208. As an example, data 210 of memory 206 may store information, such as calibration information, to be used when calibrating different types of sensors, mirrors and other parts of a perception system.

The one or more processor 204 may be any conventional processors, such as commercially available CPUs. Alternatively, the one or more processors may be a dedicated device such as an ASIC or other hardware-based processor, FPGA or the like. Although FIG. 2A functionally illustrates the processor(s), memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100. The autonomous driving computing system may be capable of communicating with various components of the vehicle in order to perform route planning and driving operations. For example, the computing devices 202 may be in communication with various systems of the vehicle, such as a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle).

The computing devices 202 are also operatively coupled to a perception system 224 (for detecting objects in the vehicle's environment), a power system 226 (for example, a battery and/or gas or diesel powered engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode.

The computing devices 202 may control the direction and speed of the vehicle by controlling various components. By way of example, computing devices 202 may navigate the vehicle to a destination location completely autonomously using data from the map information and navigation system 220. Computing devices 202 may use the positioning system 222 to determine the vehicles location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears (e.g., via the transmission system 230), and/or by applying brakes by deceleration system 212), change direction (e.g., by turning the front or other wheels of vehicle 100 by steering system 216), and signal such changes (e.g., by lighting turn signals of signaling system 218). Thus, the acceleration system 214 and deceleration system 212 may be a part of a drivetrain or other transmission system 230 that includes various components between an engine of the vehicle and the wheels of the vehicle. Again, by controlling these systems, computing devices 202 may also control the transmission system 230 of the vehicle in order to maneuver the vehicle autonomously.

As an example, computing devices 202 may interact with deceleration system 212 and acceleration system 214 in order to control the speed of the vehicle. Similarly, steering system 216 may be used by computing devices 202 in order to control the direction of vehicle. For example, if the vehicle is configured for use on a road, such as a tractor-trailer truck or a construction vehicle, the steering system 216 may include components to control the angle of the wheels of the tractor unit to turn the vehicle. Signaling system 218 may be used by computing devices 202 in order to signal the vehicle's intent to other drivers or vehicles, for example, by lighting turn signals or brake lights when needed.

Navigation system 220 may be used by computing devices 202 in order to determine and follow a route to a location. In this regard, the navigation system 220 and/or data 210 may store map information, e.g., highly detailed maps that computing devices 202 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line.

The perception system 224 also includes one or more sensors or other components for detecting objects external to the vehicle such as other vehicles, obstacles in the roadway, traffic signals, signs, trees, etc. For example, the perception system 224 may include one or more light detection and ranging (lidar) sensors, acoustical (e.g., microphone or sonar) devices, radar units, cameras (e.g., optical and/or infrared), inertial sensors (e.g., gyroscopes or accelerometers), pressure sensors, and/or any other detection devices that record data which may be processed by computing devices 202. The sensors of the perception system 224 may detect objects and their characteristics such as location, orientation, size, shape, type (for instance, vehicle, pedestrian, bicyclist, vegetation, etc.), heading, and speed of movement, etc. The raw data from the sensors (e.g., lidar point clouds) and/or the aforementioned characteristics can sent for further processing to the computing devices 202 periodically or continuously as it is generated by the perception system 224. Computing devices 202 may use information from the positioning system 222 to determine the vehicle's location and the perception system 224 to detect and respond to objects when needed to reach the location safely, including planning changes to the route and/or modifying driving operations.

As indicated in FIG. 2A, the perception system 224 includes one or more sensor assemblies 232. Each sensor assembly 232 may include one or more sensors at least partly received in a housing. In one example, the sensor assemblies 232 may be arranged as sensor towers integrated into the side-view mirrors on the truck, farm equipment, construction equipment, bus or the like. Sensor assemblies 232 may also be positioned at different locations on the tractor unit 102 or on the trailer 104, as noted above with regard to FIGS. 1A-B. The computing devices 202 may communicate with the sensor assemblies located on both the tractor unit 102 and the trailer 104. Each assembly may have one or more types of sensors such as those described above.

The vehicle 200 also includes one or more mirrors 234, which may be part of the perception system 224 as shown, or which may be separate from the perception system. The mirror(s) 234 is used to reflect a beam and direct it to or from one or more sensors of the perception system 224. As discussed further below, each mirror may be placed at a particular location along the vehicle external to a corresponding sensor assembly. In some instances, the mirror may be rigidly affixed to the vehicle. In other instances, the mirror may be pivotally or otherwise adjustably affixed to the vehicle. Here, the mirror may be raised from a surface or receptacle of the vehicle when in use, and lowered towards the surface or receptacle when not in use. And in still other instances, the mirror may be coupled to and extend from a sensor assembly.

The autonomous driving computing system may perform calibration of individual sensors and their associated mirrors, all sensors in a particular sensor assembly relative to a commonly used mirror, between sensors in different sensor assemblies, between multiple mirrors in case of non-coplanar setups, etc. This may be done using a calibration system 236, which may be part of the perception system 224, the computing devices 202 or some other part of the autonomous driving computing system. In one example, the calibration system 236, perception system 224, computing devices 202 and other systems may be directly or indirectly connected via a Controller Area Network (CAN bus) of the vehicle.

Also shown in FIG. 2A is a coupling system 238 for connectivity between the tractor unit and the trailer. The coupling system 238 includes one or more power and/or pneumatic connections 240, and a fifth-wheel 242 at the tractor unit for connection to the kingpin at the trailer.

Figure 2B:
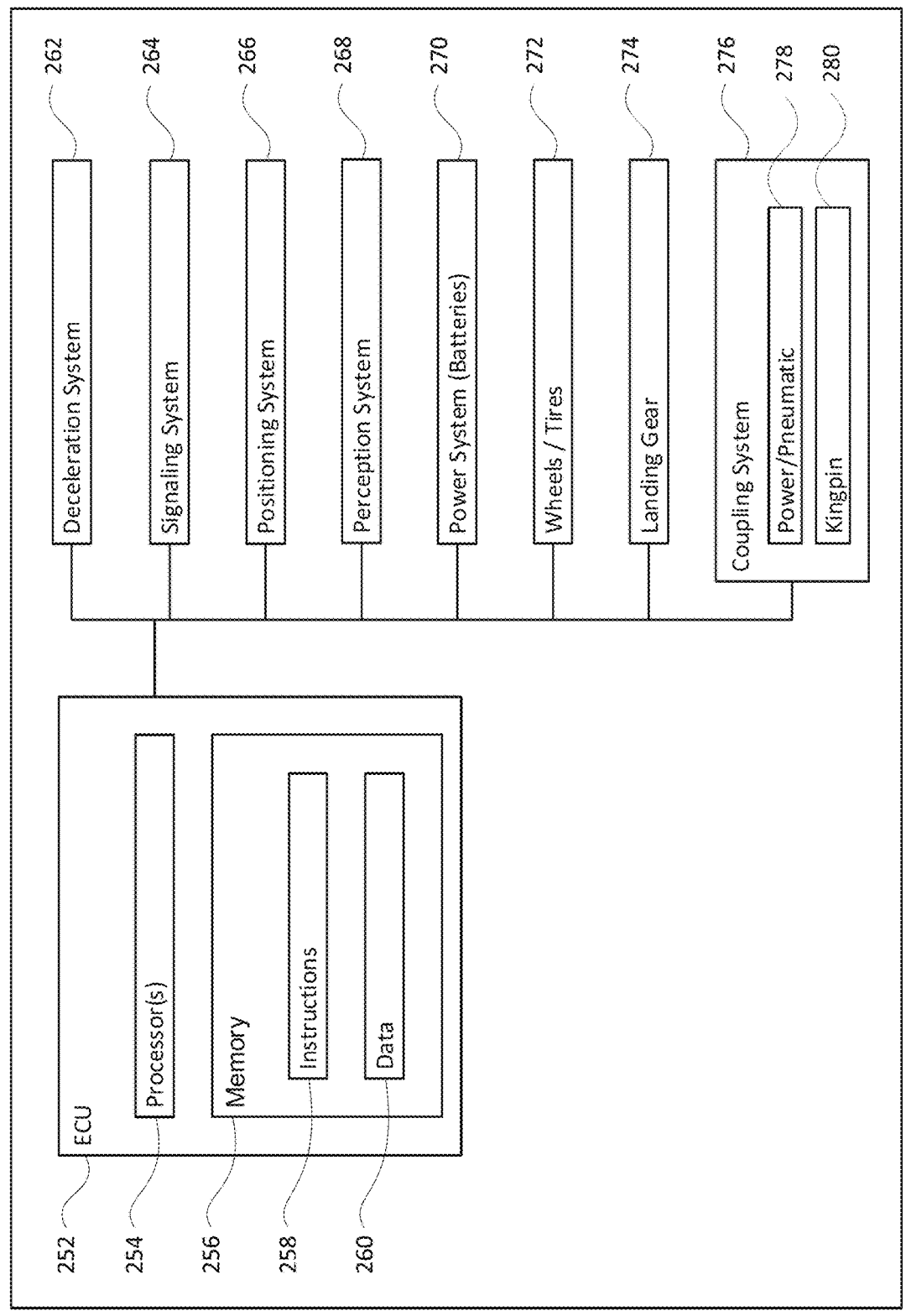
FIG. 2B illustrates a system diagram of a trailer, in accordance with aspects of the disclosure.

FIG. 2B illustrates an example block diagram 250 of a trailer. As shown, the system includes an ECU 252 of one or more computing devices, such as computing devices containing one or more processors 254, memory 256 and other components typically present in general purpose computing devices. The memory 256 stores information accessible by the one or more processors 254, including instructions 258 and data 260 that may be executed or otherwise used by the processor(s) 254. The descriptions of the processors, memory, instructions and data from FIG. 2A apply to these elements of FIG. 2B.

The ECU 252 is configured to receive information and control signals from the trailer unit. The on-board processors 254 of the ECU 252 may communicate with various systems of the trailer, including a deceleration system 262 (for controlling braking of the trailer), signaling system 264 (for controlling turn signals), and a positioning system 266 (to assist in determining the location of the trailer). The ECU 252 may also be operatively coupled to a perception system 268 with one or more sensors for detecting objects in the trailer's environment. One or more mirrors may be included as part of the perception system 268 or separate from the perception system. A power system 270 (for example, a battery power supply) provides power to local components on the trailer. Some or all of the wheels/tires 272 of the trailer may be coupled to the deceleration system 262, and the processors 254 may be able to receive information about tire pressure, balance, wheel speed and other factors that may impact driving in an autonomous mode, and to relay that information to the processing system of the tractor unit. The deceleration system 262, signaling system 264, positioning system 266, perception system 268, power system 270 and wheels/tires 272 may operate in a manner such as described above with regard to FIG. 2A.

The trailer also includes a set of landing gear 274, as well as a coupling system 276. The landing gear provide a support structure for the trailer when decoupled from the tractor unit. The coupling system 276, which may be a part of coupling system 238, provides connectivity between the trailer and the tractor unit. The coupling system 276 may include a connection section 278 (e.g., for power and/or pneumatic links) to provide backward compatibility with legacy trailer units that may or may not be capable of operating in an autonomous mode. The coupling system also includes a kingpin 280 configured for connectivity with the fifth-wheel of the tractor unit.

While the components and systems of FIGS. 2A-B are described in relation to a tractor-trailer arrangement, as noted above the technology may be employed with other types of articulated vehicles, such as the articulate bus 120 of FIGS. 1C-D.

Figure 2C:
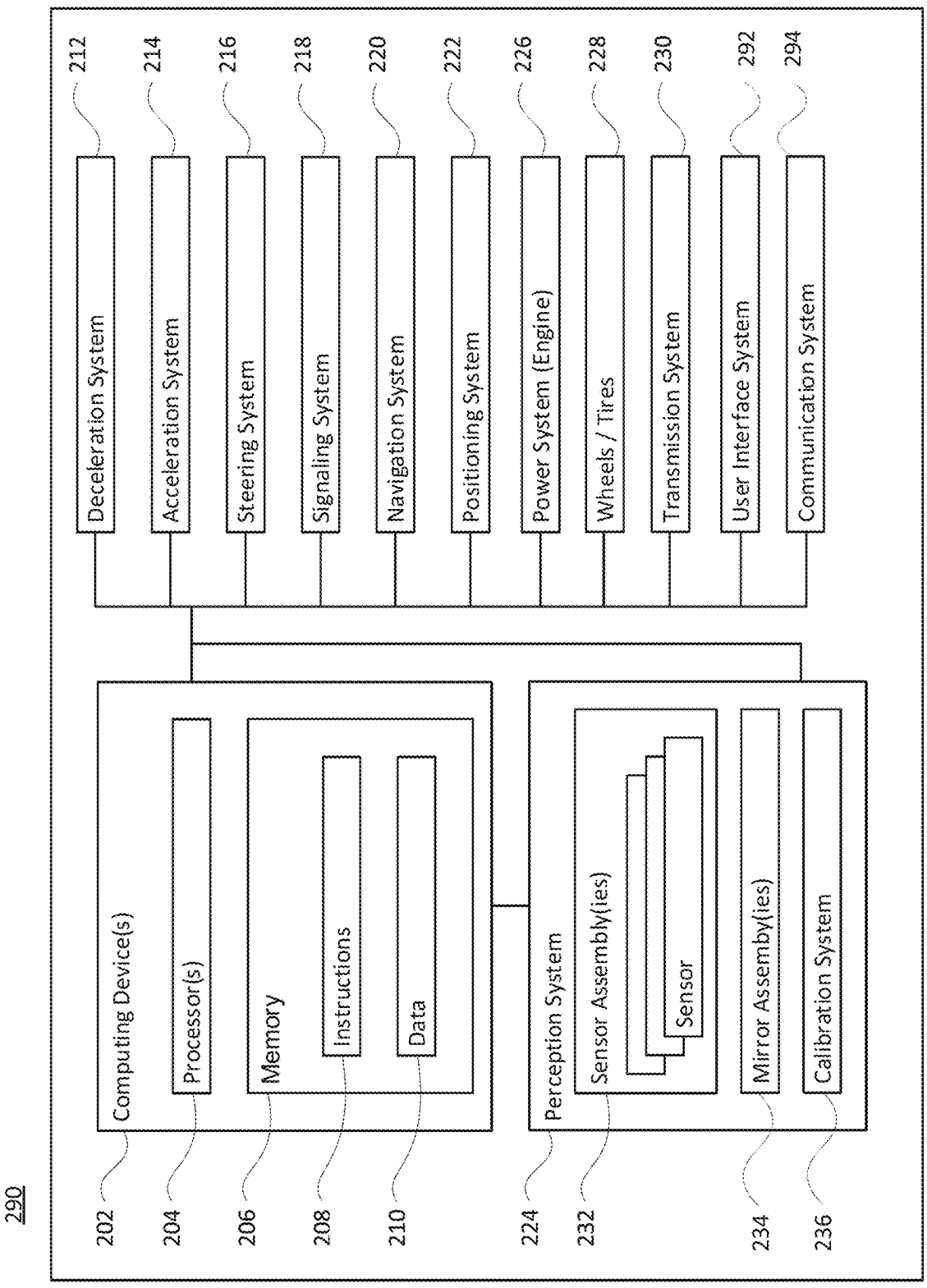
FIG. 2C illustrates a system diagram of another autonomous vehicle control system in accordance with aspects of the disclosure.

FIG. 2C illustrates a block diagram 290 with various components and systems of a passenger-type vehicle such as shown in FIG. 1E, configured to operate in a fully or semi-autonomous mode of operation. The passenger-type vehicle may be, e.g., a car, motorcycle, recreational vehicles, etc. The block diagram 290 shows that the passenger vehicle may have components and systems that are equivalent to what is shown and described in block diagram 200, for instance to form an autonomous driving computing system for controlling vehicle 140 of FIG. 1E.

A user interface system 292 may include, e.g., a mouse, keyboard, touch screen and/or microphone, as well as one or more displays (e.g., a touch screen display with or without haptic feedback, a heads-up display, or the like) that is operable to display information to passengers in the vehicle. In this regard, an internal electronic display may be located within a cabin of vehicle 140 (not shown) and may be used by computing devices 202 to provide information to the passengers.

Also shown in FIG. 2C is a communication system 294. The communication system 238 may also include one or more wireless connections to facilitate communication with other computing devices, such as passenger computing devices within the vehicle, and computing devices external to the vehicle, such as in another nearby vehicle on the roadway or a remote server system. The wireless connections may include short range communication protocols such as Bluetooth™ or Bluetooth™ low energy (LE), cellular connections, etc. Various configurations and protocols may be employed, such as Ethernet, WiFi and HTTPS, for communication via the Internet, intranets, virtual private networks, wide area networks, local networks, private networks using communication protocols proprietary to one or more companies, and various combinations of the foregoing.

Example Implementations

In view of the structures and configurations described above and illustrated in the figures, various implementations will now be described.

Information obtained from one or more sensors is employed so that the vehicle may operate in an autonomous mode. Each sensor, or type of sensor, may have a different range, resolution and/or field of view (FOV).

For instance, the sensors may include a long range, narrow FOV lidar and a short range, tall FOV lidar. In one example, the long range lidar may have a range exceeding 50-250 meters, while the short range lidar has a range no greater than 1-50 meters. Alternatively, the short range lidar may generally cover up to 10-15 meters from the vehicle while the long range lidar may cover a range exceeding 100 meters. In another example, the long range is between 10-200 meters, while the short range has a range of 0-20 meters. In a further example, the long range exceeds 80 meters while the short range is below 50 meters. Intermediate ranges of between, e.g., 10-100 meters can be covered by one or both of the long range and short range lidars, or by a medium range lidar that may also be included in the sensor system. The medium range lidar may be disposed between the long and short range lidars in a single housing. In addition to or in place of these lidars, a set of cameras may be arranged, for instance to provide forward, side and rear-facing imagery. Similarly, a set of radar sensors may also be arranged to provide forward, side and rear-facing data. Other sensors may include an inertial sensor such as a gyroscope, an accelerometer, etc.

Figure 3A:
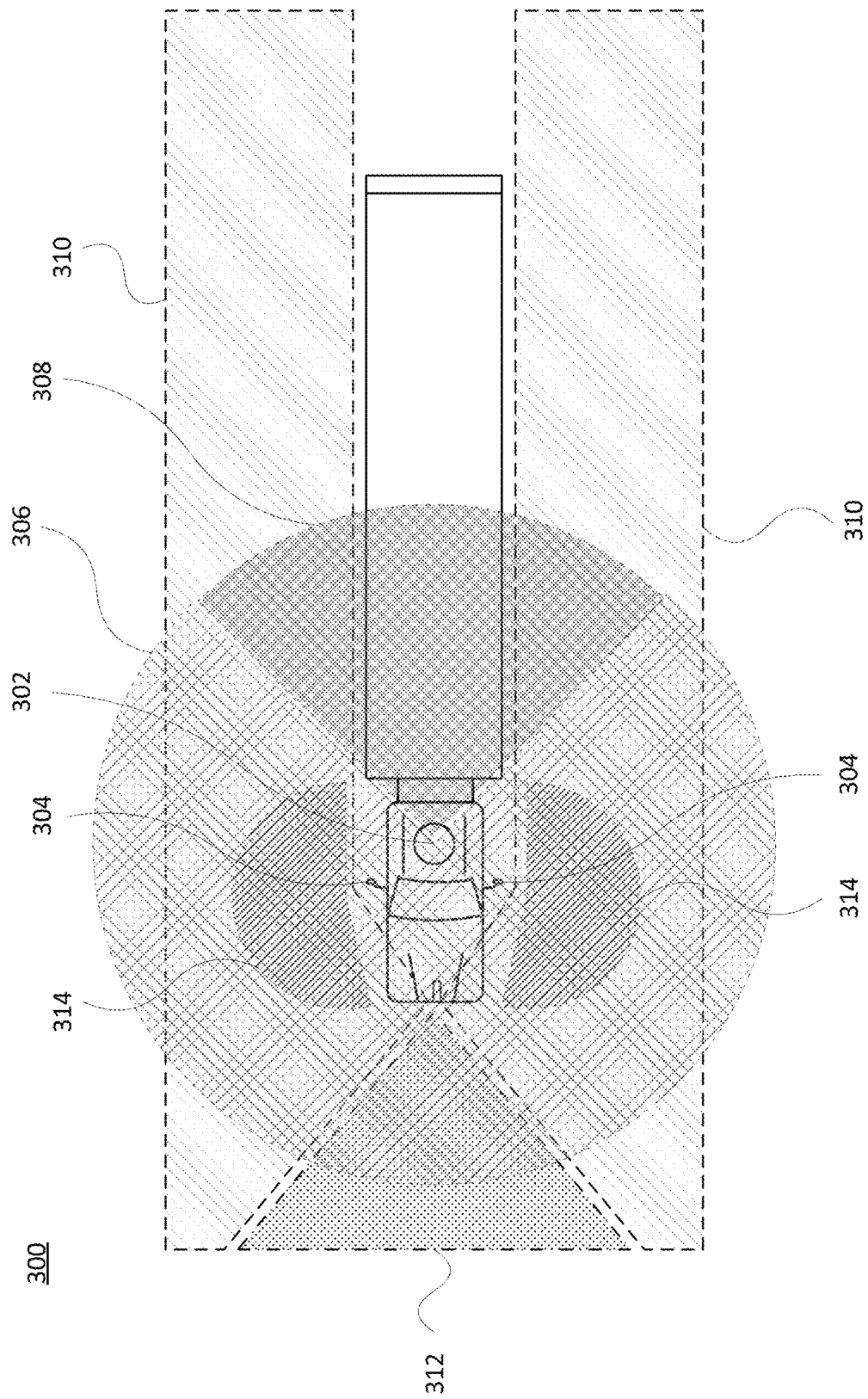
FIG. 3A is an example of sensor coverage for a vehicle in accordance with aspects of the disclosure.
Figure 3B:
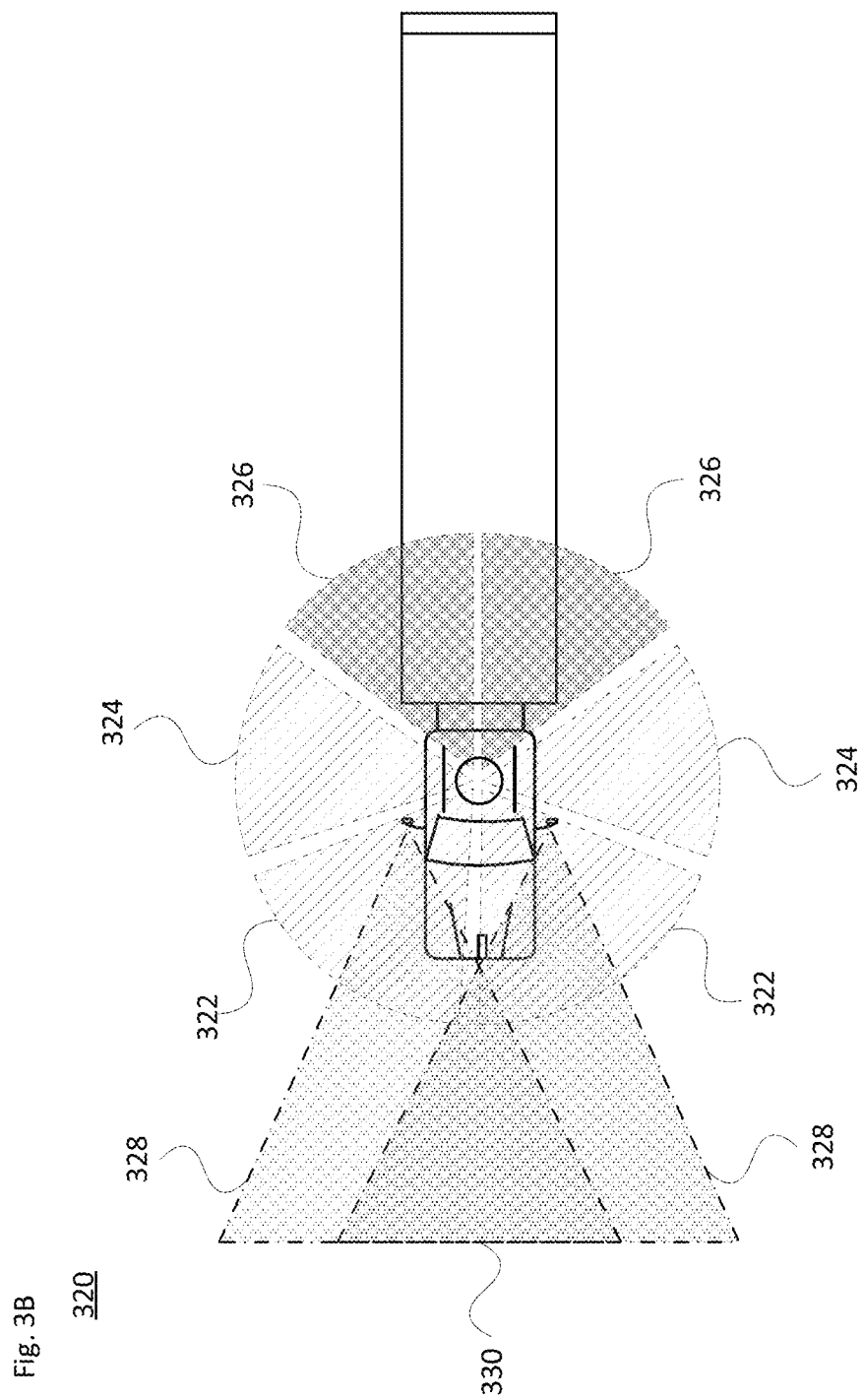
FIG. 3B is another example of sensor coverage for a vehicle in accordance with aspects of the disclosure.

Examples of lidar, camera and radar sensors and their fields of view are shown in FIGS. 3A and 3B. In example 300 of FIG. 3A, one or more lidar units may be located in rooftop sensor housing 302, with other lidar units in side sensor housings 304. In particular, the rooftop sensor housing 302 may be configured to provide a 360° FOV. A pair of sensor housings 304 may be located on either side of the tractor unit cab, for instance integrated into a side view mirror assembly, along a side door or quarterpanel of the cab, or extending out laterally along one or both sides of the cab roof. In one scenario, long range lidars may be located along a top or upper area of the sensor housings 302 and 304. The long range lidar may be configured to see over the hood of the vehicle. And short range lidars may be located in other portions of the sensor housings 302 and 304. The short range lidars may be used by the perception system to determine whether an object such as another vehicle, pedestrian, bicyclist, etc. is next to the front or side of the vehicle and take that information into account when determining how to drive or turn. Both types of lidars may be co-located in the housing, for instance aligned along a common vertical axis.

As illustrated in FIG. 3A, the lidar(s) in the rooftop sensor housing 302 may have a FOV 306. Here, as shown by region 308, the trailer or other articulating portion of the vehicle may provide signal returns, and may partially or fully block a rearward view. Long range lidars on the left and right sides of the tractor unit have fields of view 310. These can encompass significant areas along the sides and front of the vehicle. As shown, there may be an overlap region 312 of their fields of view in front of the vehicle. The overlap region 312 provides the perception system with additional or information about a very important region that is directly in front of the tractor unit. This redundancy also has a safety aspect. Should one of the long range lidar sensors suffer degradation in performance, the redundancy would still allow for operation in an autonomous mode. Short range lidars on the left and right sides may have different (e.g., smaller) fields of view 314. A space is shown between different fields of view for clarity in the drawing; however in actuality there may be no break in the coverage. The specific placements of the sensor assemblies and fields of view is merely exemplary, and may different depending on, e.g., the type of vehicle, the size of the vehicle, FOV requirements, etc.

FIG. 3B illustrates an example configuration 320 for either (or both) of radar and camera sensors in a rooftop housing and on both sides of a tractor-trailer vehicle. Here, there may be multiple radar and/or camera sensors in each of the sensor housings 302 and 304. As shown, there may be sensors in the rooftop housing with front fields of view 322, side fields of view 324 and rear fields of view 326. As with region 308, the trailer may impact the ability of the sensor to detect objects behind the vehicle. Sensors in the sensor housings 304 may have forward facing fields of view 328 (and side and/or rear fields of view as well). As with the lidars discussed above with respect to FIG. 3A, the sensors of FIG. 3B may be arranged so that the adjoining fields of view overlap, such as shown by overlapping region 330. The overlap regions here similarly can provide redundancy and have the same benefits should one sensor suffer degradation in performance.

FIG. 4 illustrates a vehicle using sensor assembly to scan for objects in the environment. The sensor assembly may be, e.g., rooftop sensor housing 302 of FIG. 3A. The sensor assembly may include one or more lidar, radar, camera or other sensors therein. Solid and dashed lines emanating from the housing indicate examples of individual scans of the environment. For instance, 10 (or more or less) individual scans may be made by a given sensor per scan period. This may include adjusting the sensor's FOV up or down, left or right, e.g., with a motor, servo or other actuator. The individual scans may be selected to cover particular portions of the sensor's FOV or selected regions around the vehicle.

Figure 5:
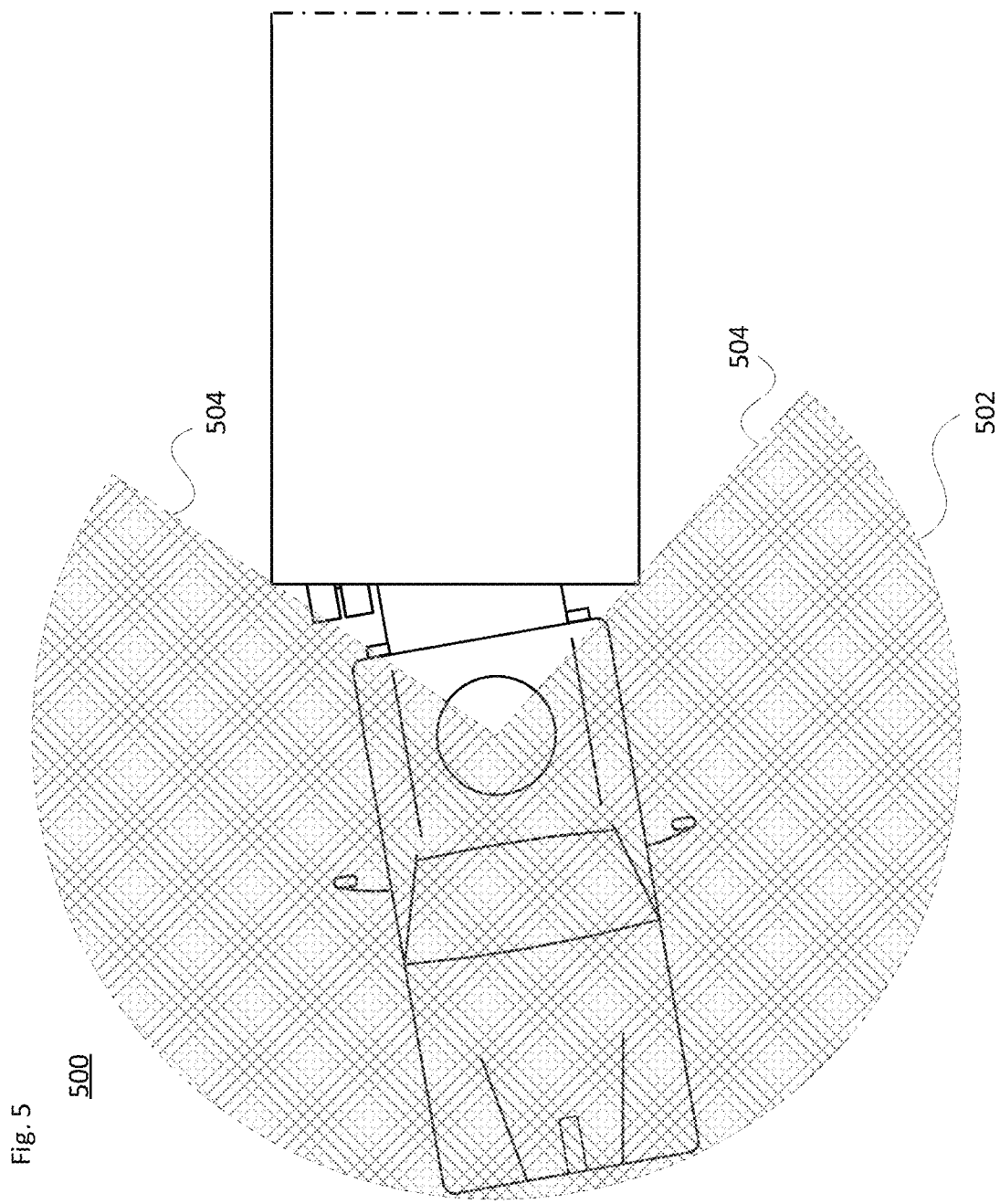
FIG. 5 illustrates an example of sensor field of view obstruction.

FIG. 5 illustrates a top-down view 500 of an obstructed FOV, for instance due to a trailer of the vehicle. Here, the sensor (e.g., a lidar sensor) may be located on a roof of the vehicle. Only a portion of the trailer is shown, as indicated by the dash-dot line towards the rear of the trailer. The sensor's overall FOV 502 may be obstructed by corners of the trailer, as shown by FOV edges 504. In order to overcome such an obstruction, according to one aspect reflective surfaces (mirrors) may be used to redirect emitted light beams or radio waves from a sensor towards the obstructed area. According to another aspect, received light beams, radio waves or imagery are reflected off of the mirror(s) towards the sensor. The sensor may have a transmitter portion (e.g., laser, transmit antenna) for emitted light beams or radio waves and/or a receiver portion (e.g., photodetector, receive antenna, CCD or CMOS image sensor) for received light beams, radio waves or imagery.

In one example, existing mirrors (e.g., side view mirrors) or other reflective surfaces can be employed. In other examples, one or more mirrors may be distributed at different places along the tractor, trailer or other parts of the vehicle. This could include placing one or more mirrors along the cab, a fairing on the tractor or trailer, extending from a portion of the sensor housing, etc. Various examples are shown in FIGS. 6A-B through 9A-B.

Figure 6A:
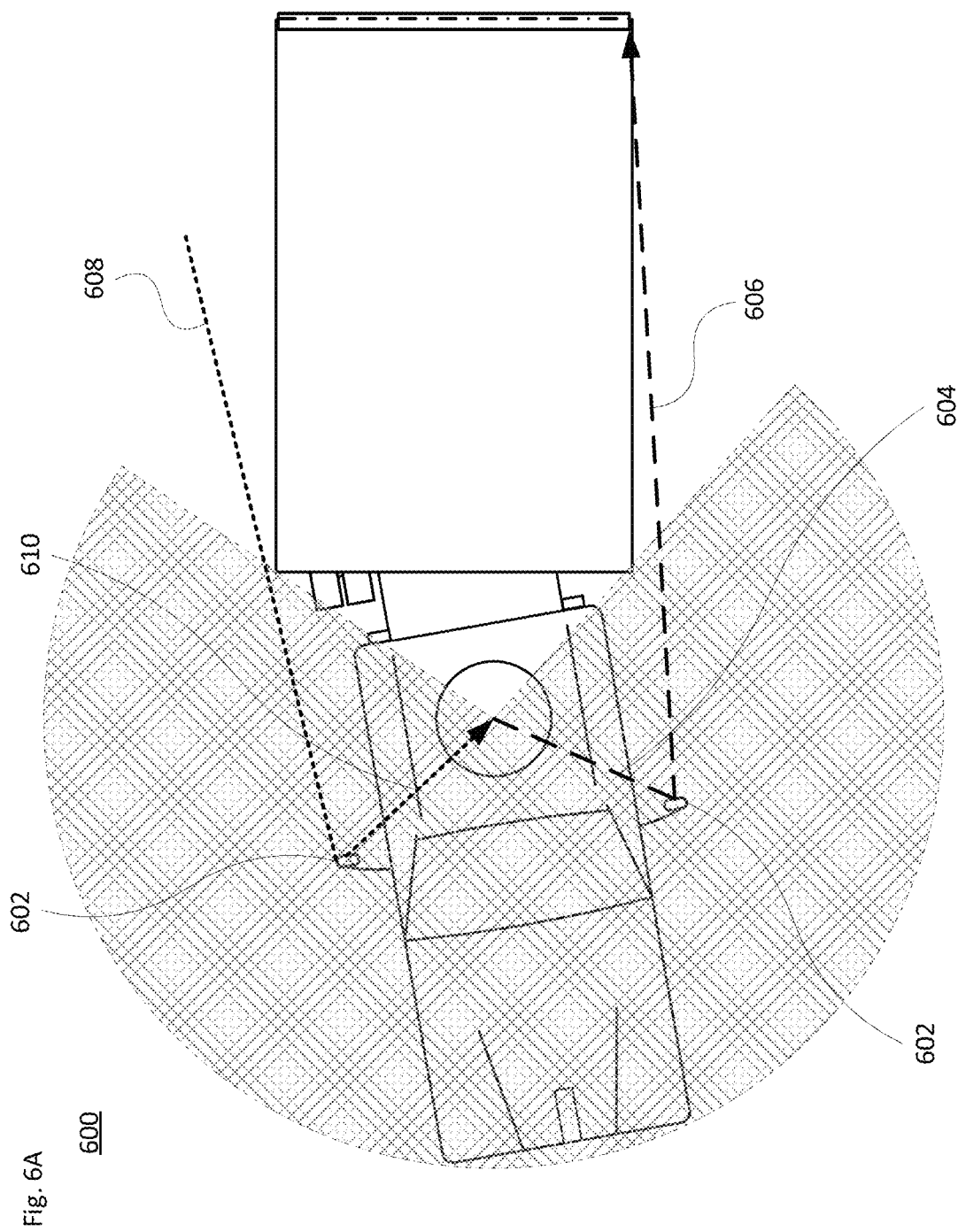
FIGS. 6A-B illustrate a field of view scenario in accordance with aspects of the disclosure.
Figure 6B:
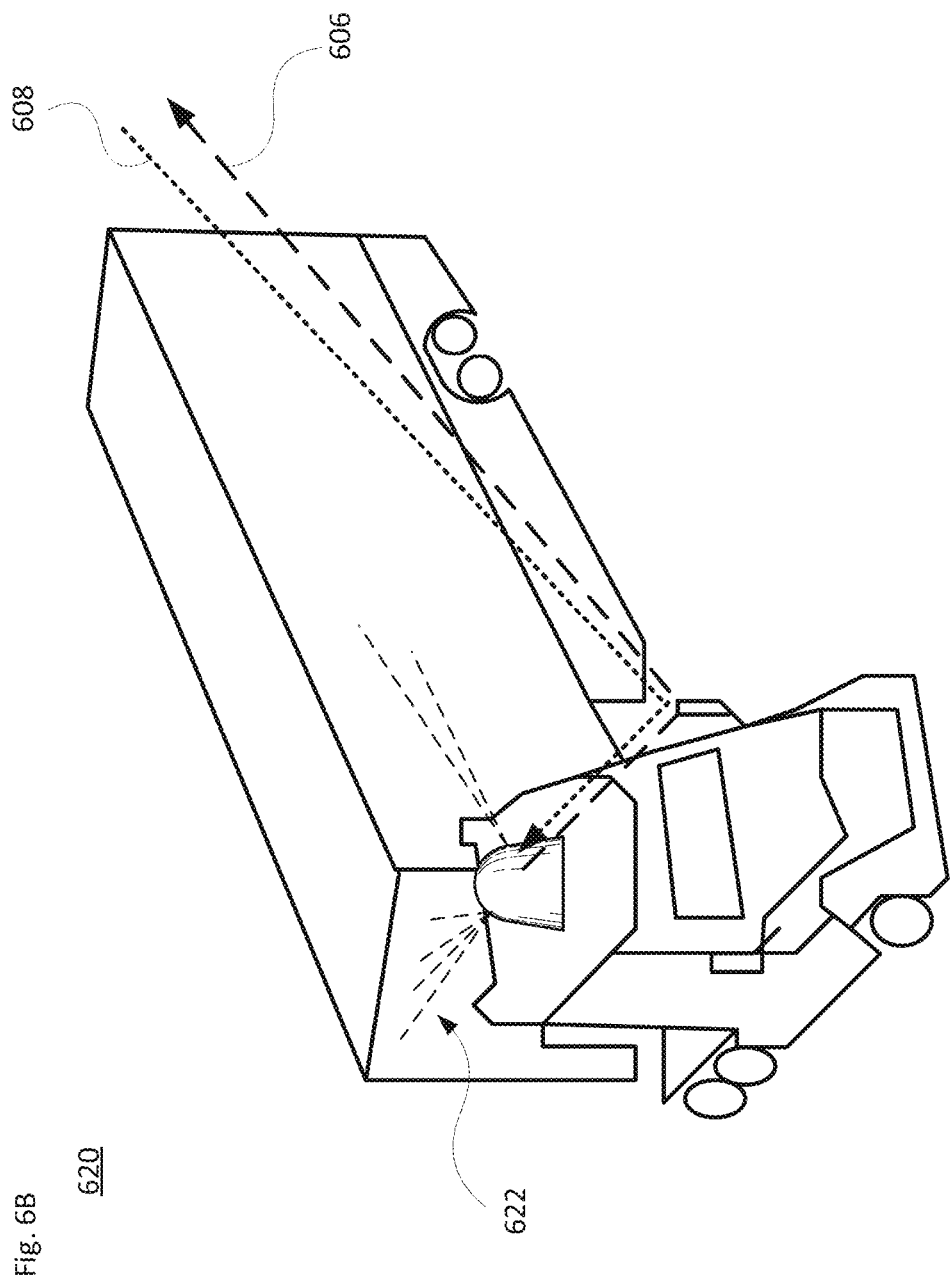

For instance, FIGS. 6A-B illustrate a scenario 600 using side-view mirrors 602 located on either side of the vehicle cab. In this example, the sensor may be a lidar sensor that emits laser light as shown by dashed line 604. One or more beams of the emitted light are directed toward and reflect off of the mirror 602. The reflected beams, shown by dashed line 606, may be directed toward a blind spot or other area around the vehicle. Light received from the environment, as shown by dotted line 608, is reflected off of a mirror 602 and directed toward the sensor, as shown by dotted line 610. For ease of illustration in this figure, emitted light is shown reflecting off of the mirror on the left side of the vehicle while received light is shown reflecting off of the mirror on the right side of the vehicle. In operation, each mirror may be used to emit and/or receive laser light (or RF waves, optical or infrared imagery, etc.). FIG. 6B illustrates a perspective view 620 of the scenario, showing a mirror reflecting the beam (or radio waves) towards and from a blind spot along the rear of the vehicle. Shorter dashed lines 622 illustrate emitted beams (or radio waves) that are not reflected by the mirror but which may be blocked by a portion of the vehicle (e.g., a front or side surface of the trailer).

Figure 7A:
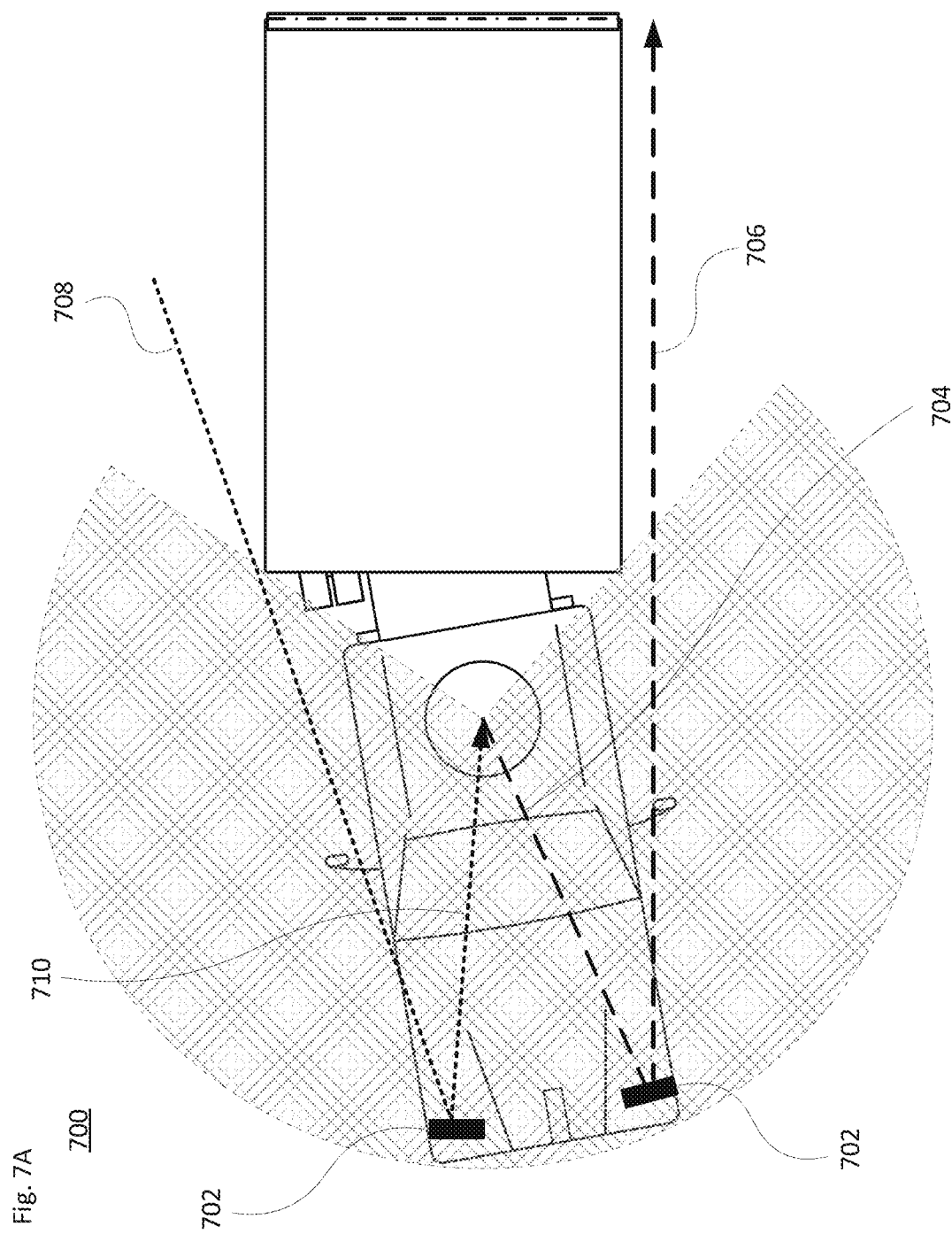
FIGS. 7A-B illustrate another field of view scenario in accordance with aspects of the disclosure.
Figure 7B:
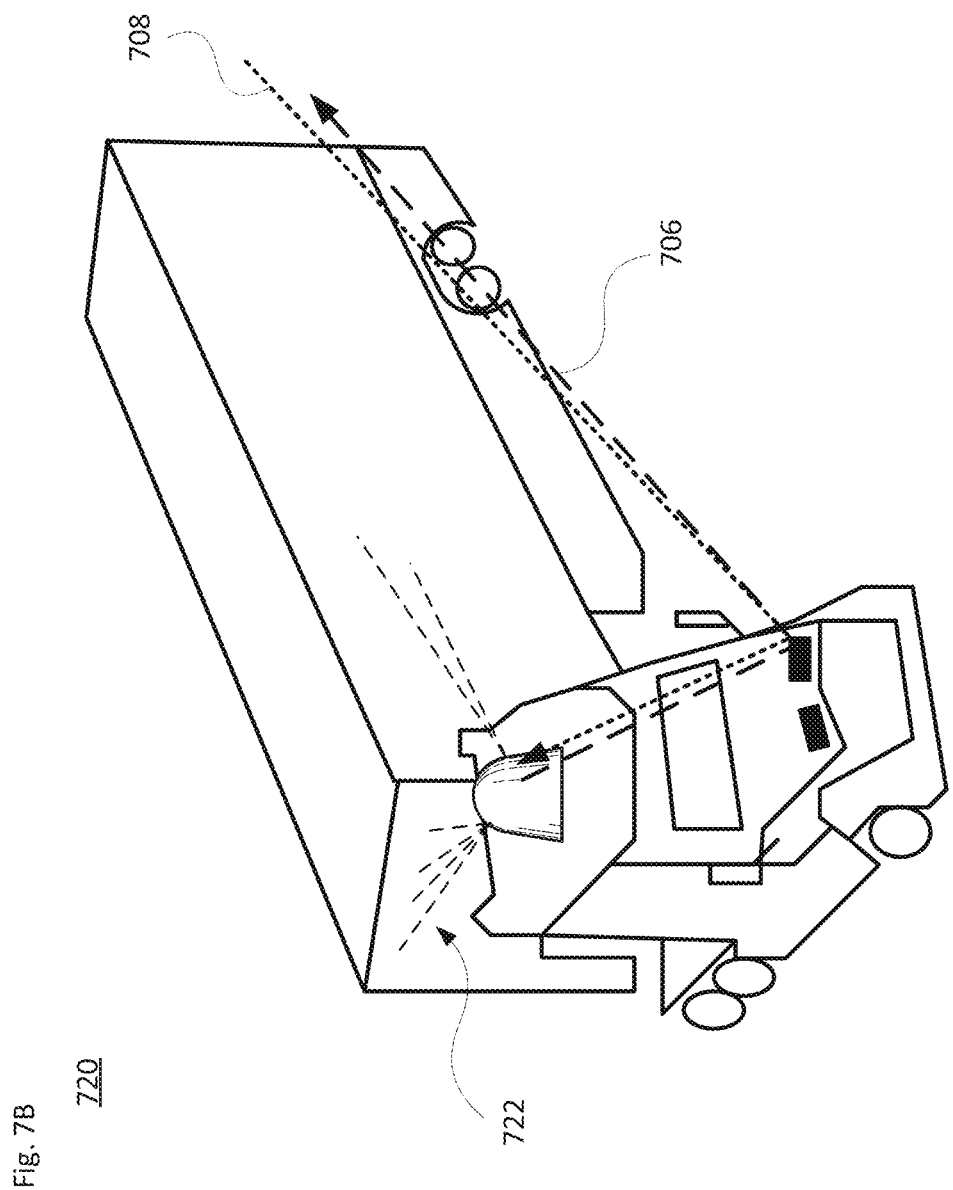

FIGS. 7A-B illustrate a scenario 700 using mirrors 702 located on or extending from one or more surfaces of the vehicle, such as the cab. As above, the sensor may be a lidar sensor that emits laser light as shown by dashed line 704. One or more beams of the emitted light are directed toward and reflect off of the mirror 702. The reflected beams, shown by dashed line 706, may be directed toward a blind spot or other area around the vehicle. Light received from the environment, as shown by dotted line 708, is reflected off of a mirror 702 and directed toward the sensor, as shown by dotted line 710. Again, for ease of illustration, emitted light is shown reflecting off of the mirror on the left side of the vehicle while received light is shown reflecting off of the mirror on the right side of the vehicle. In operation, each mirror may be used to emit and/or receive laser light (or RF waves, optical or infrared imagery, etc.). FIG. 7B illustrates a perspective view 720 of the scenario, showing a mirror reflecting the beam (or radio waves) towards and from a blind spot along the rear of the vehicle. Shorter dashed lines 722 illustrate emitted beams (or radio waves) that are not reflected by the mirror but which may be blocked by a portion of the vehicle (e.g., a surface of the trailer). In this scenario, the mirror(s) 702 may be rigidly affixed or otherwise permanently positioned to a surface of the vehicle.

Alternatively, the mirror(s) 702 may be configured to pop up or otherwise extend from the vehicle during use, and retract onto or into the vehicle when not in use. In one scenario, pop-up mirrors could be used on an as-needed basis, for instance when the perception system determines that a blind spot exists or that a determined blind spot exceeds some threshold size. This would reduce wind drag during typical vehicle operation. In this case, a mirror could be extended one or more preset or calculated distances in specific situations. Such pop-up mirrors could also be steerable, for instance via a servo mechanism that provides one or more degrees of freedom, e.g., by panning and/or tilting the mirror or an arm member that couples the mirror to the vehicle. Here, the servo mechanism could be used to reflect beams toward (or from) needed areas of visibility. For example, when the vehicle is driving in a crowded surroundings, the system can pop up mirrors to reflect high light beams down to the nearby areas. The servo mechanism could also be used in conjunction with a calibration system to address vibration-related issues, for instance by dampening vibration of a mirror.

Figure 8A:
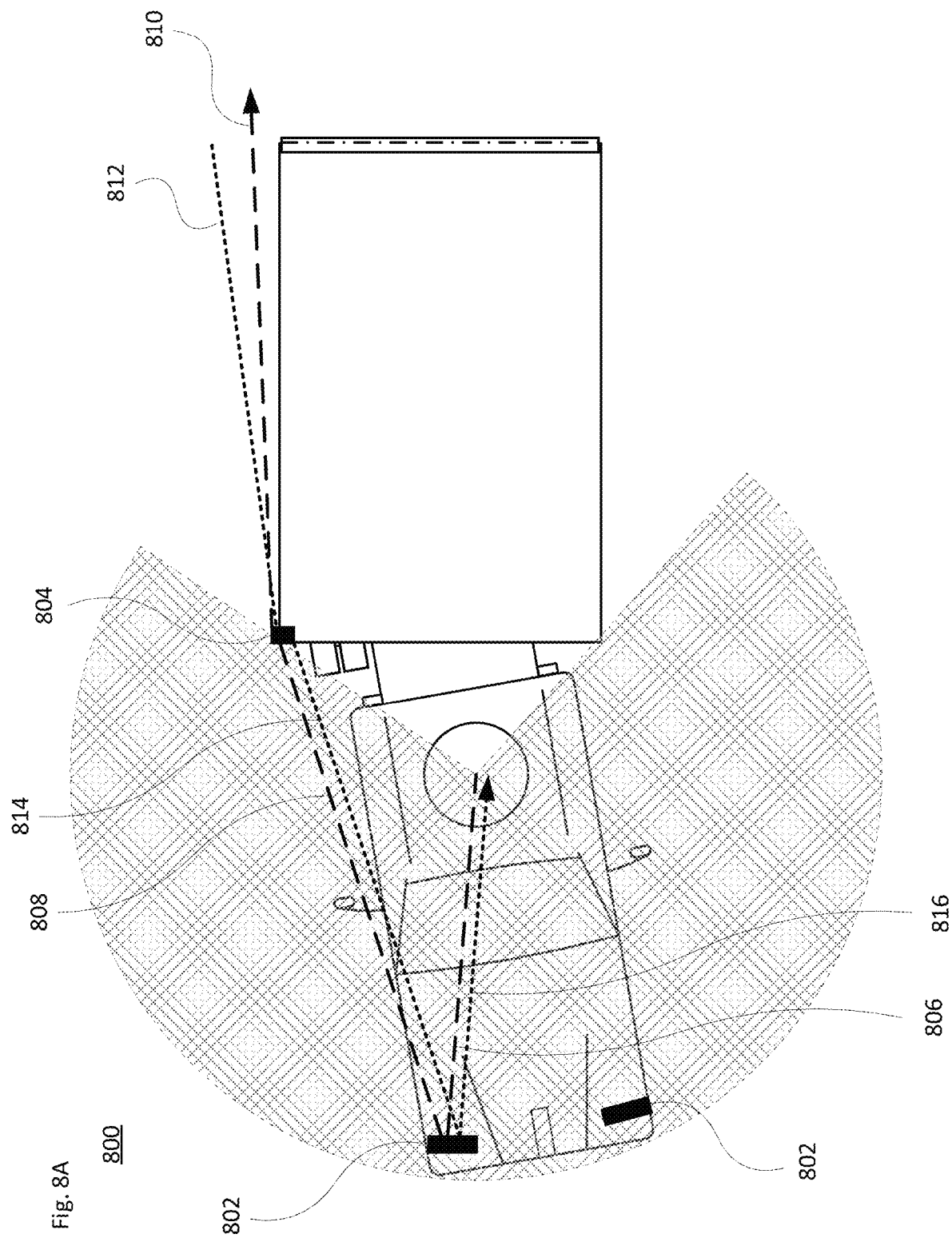

FIGS. 8A-B illustrate another scenario 800 using one or more first mirrors 802 located on or extending from one or more surfaces of the vehicle (e.g., the cab), and one or more second mirrors 804 along another part of the vehicle (e.g., a corner or fairing of the trailer). As above, the sensor may be a lidar sensor that emits laser light as shown by dashed line 806. One or more first reflected beams 808 of the emitted light are directed toward and reflect off of the first mirror 802. The first reflected beams 808 are then redirected as second reflected beams 810 by the second mirror 804. The second reflected 808 may be directed toward a blind spot or other area around the vehicle.

Light received from the environment, as shown by dotted line 812, is reflected off of second mirror 804 and directed toward the first mirror 802 as first reflected beam 814. Then the first reflected beam 814 is directed toward and reflected off of the first mirror 802 and towards the sensor, as shown by dotted line 816. As noted above, in operation each mirror may be used to emit and/or receive laser light (or RF waves or optical imagery). FIG. 8B illustrates a perspective view 820 of the scenario, showing a mirror reflecting the beam (or radio waves) towards and from a blind spot along the rear of the vehicle. Shorter dashed lines 822 illustrate emitted beams (or radio waves) that are not reflected by the mirror but which may be blocked by a portion of the vehicle (e.g., a surface of the trailer). While only first and second mirrors are shown in this example, one or more additional mirrors may also be employed. In this scenario, the mirrors 802 and/or 804 may be rigidly affixed or otherwise permanently positioned to a surface of the vehicle. Alternatively, as with mirrors 702, the mirrors 802 and/or 804 may be configured to pop up or otherwise extend from the vehicle during use, and retract onto or into the vehicle when not in use. In one scenario, such pop-up mirrors could be used on an as-needed basis, for instance in response to detection of a blind spot or a change in the size of a blind spot.

Figure 9A:
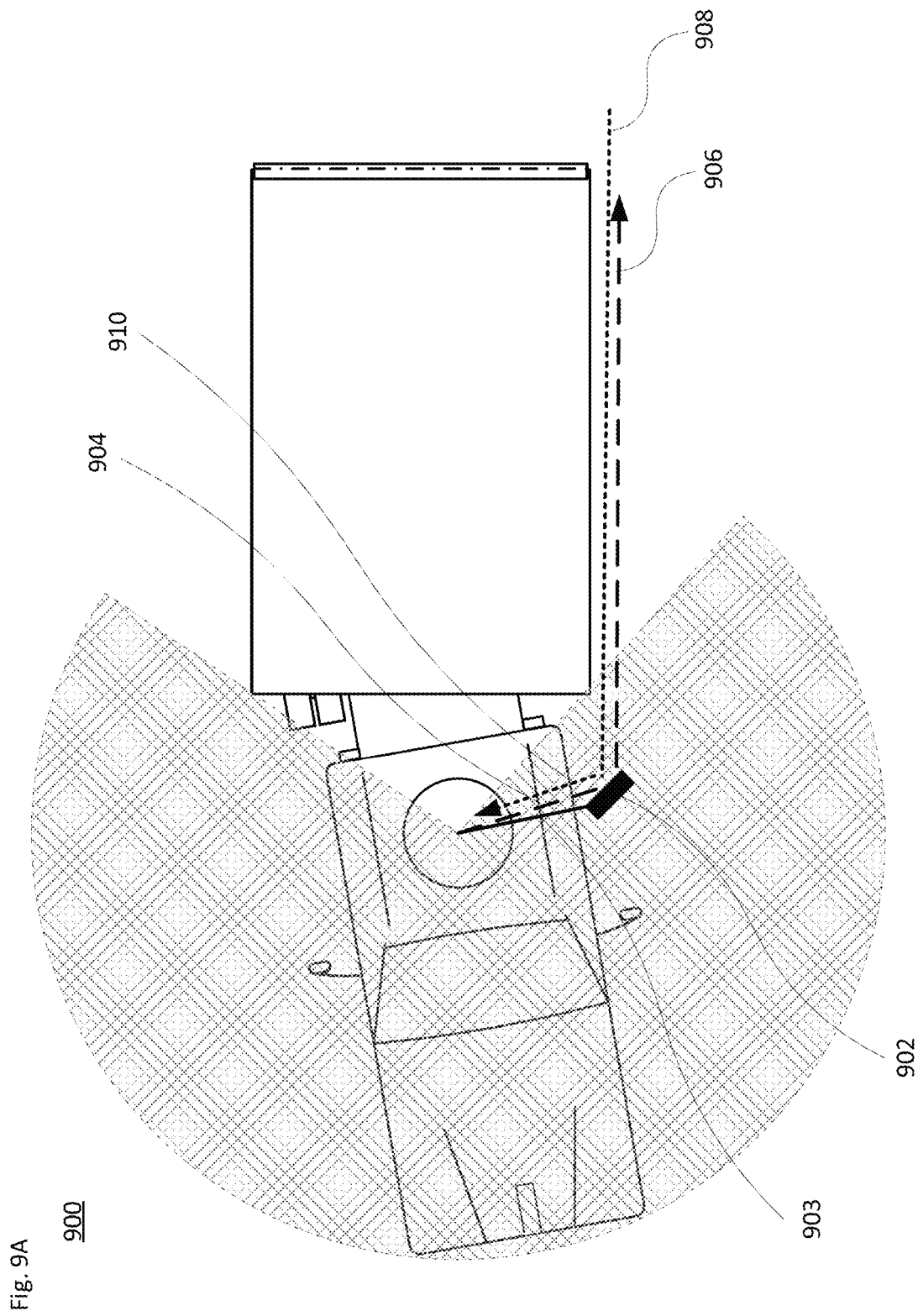
FIGS. 9A-B illustrate yet another field of view scenario in accordance with aspects of the disclosure.
Figure 9B:
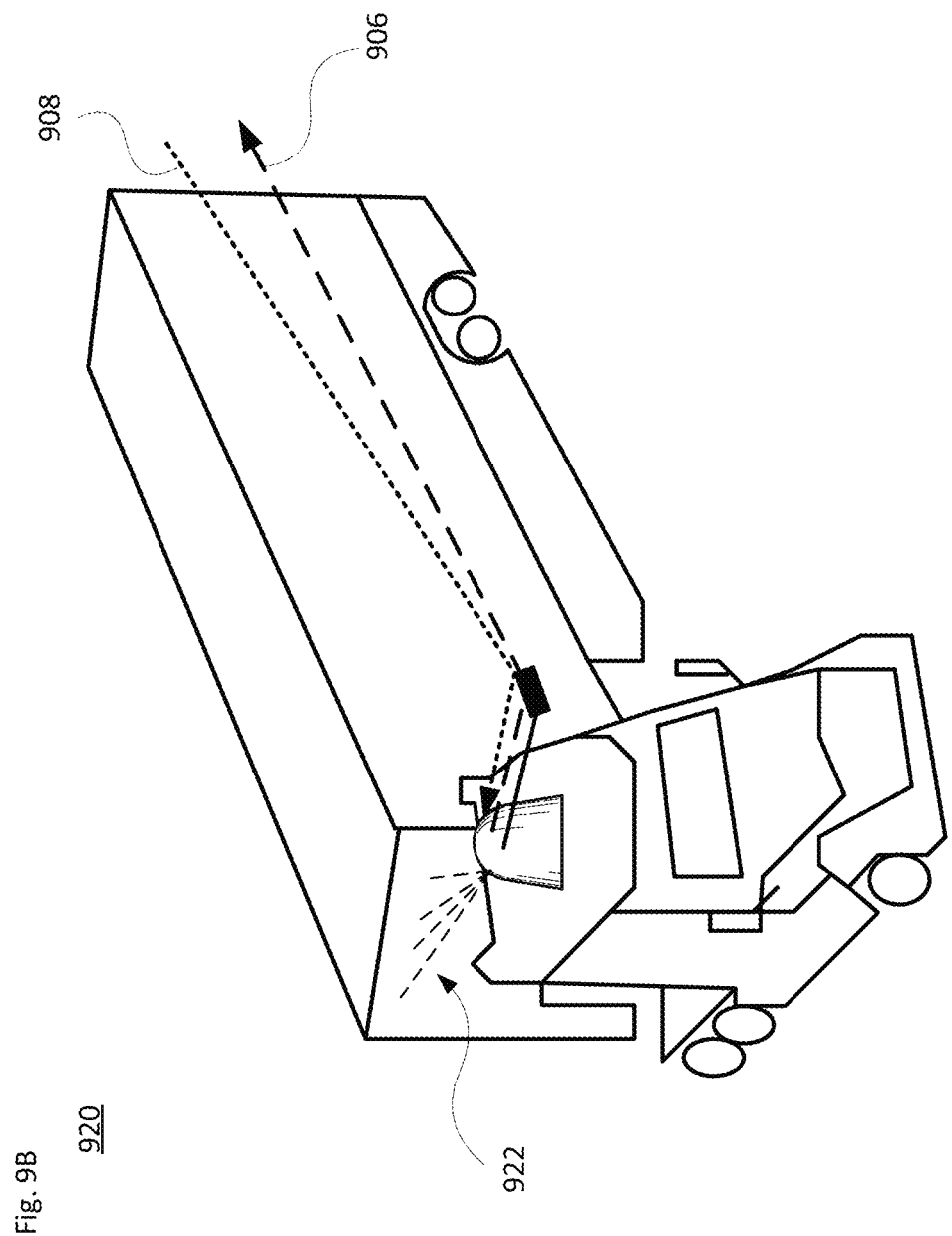

And FIGS. 9A-B illustrate yet another scenario 900 using a mirror 902 that extends from the sensor housing, e.g., via an extendable or maneuverable arm 903. In this example, the sensor may be a lidar sensor that emits laser light as shown by dashed line 904. One or more beams of the emitted light are directed toward and reflect off of the mirror 902. The reflected beams, shown by dashed line 906, may be directed toward a blind spot or other area around the vehicle. Light received from the environment, as shown by dotted line 908, is reflected off of the mirror 902 and directed toward the sensor, as shown by dotted line 910. In operation, the mirror 902 may be used to emit and/or receive laser light (or RF waves, optical or infrared imagery, etc.). FIG. 9B illustrates a perspective view 920 of the scenario, showing a mirror reflecting the beam (or radio waves) towards and from a blind spot along the rear of the vehicle. Shorter dashed lines 922 illustrate emitted beams (or radio waves) that are not reflected by the mirror but which may be blocked by a portion of the vehicle (e.g., a front or side surface of the trailer).

Any combination of mirror configurations according to the above examples may be employed according to aspects of the technology.

Figure 10A:
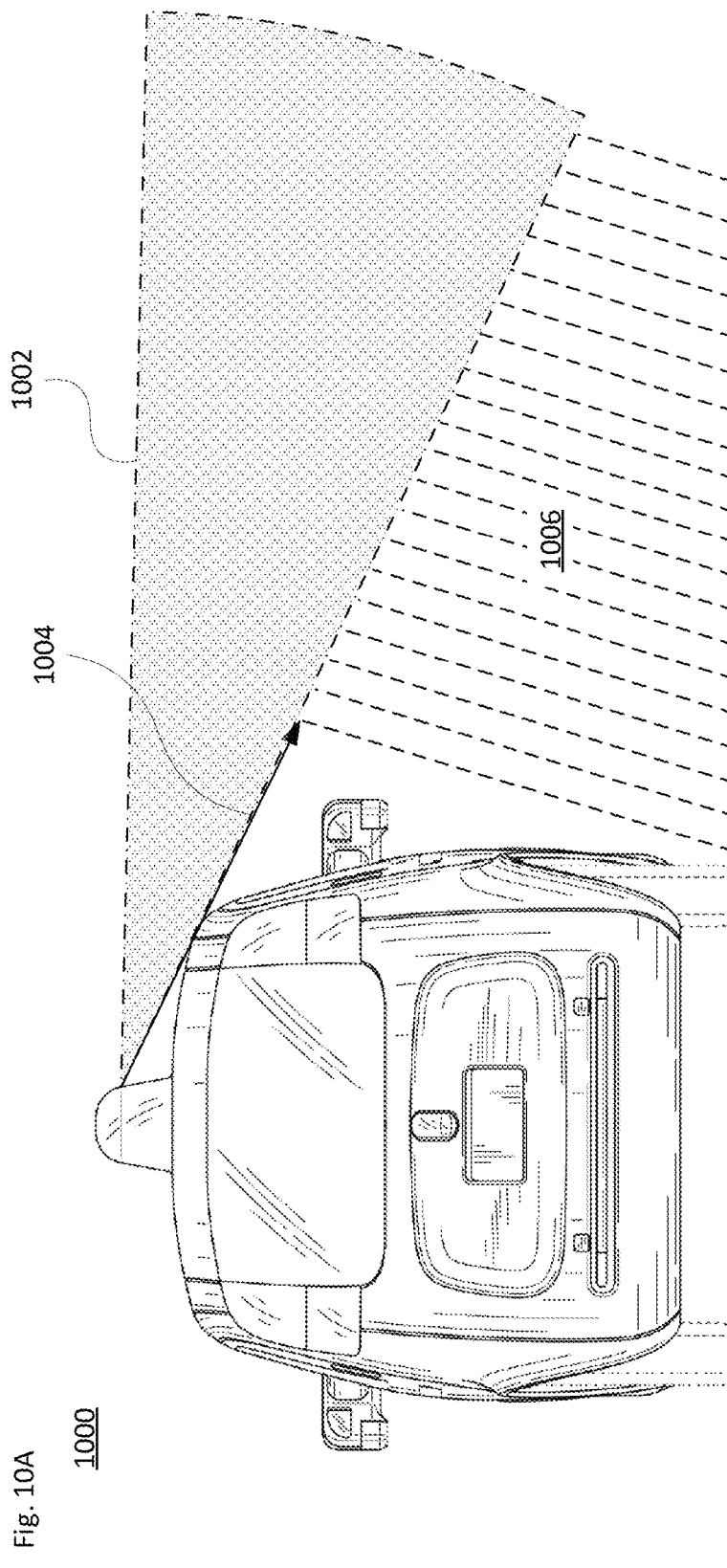

FIGS. 10A-B illustrate another example that shows an enhancement to the sensor's FOV by reducing a blind spot. FIG. 10A illustrates a first scenario 1000 with passenger vehicle having a rooftop sensor with a FOV 1002. Arrow 1004 represents the lower limit of the FOV, for instance due to a corner or other portion of the vehicle. As seen in this rear view, a blind spot 1006 is adjacent to a side of the vehicle. FIG. 10B illustrates a second scenario 1010. In this scenario, the base FOV 1002 can be enhanced with an added FOV 1012 via mirror 1014. As a result, blind spot 1016 can be made much smaller than initial blind spot 1006 (or eliminated entirely).

Figure 11A:
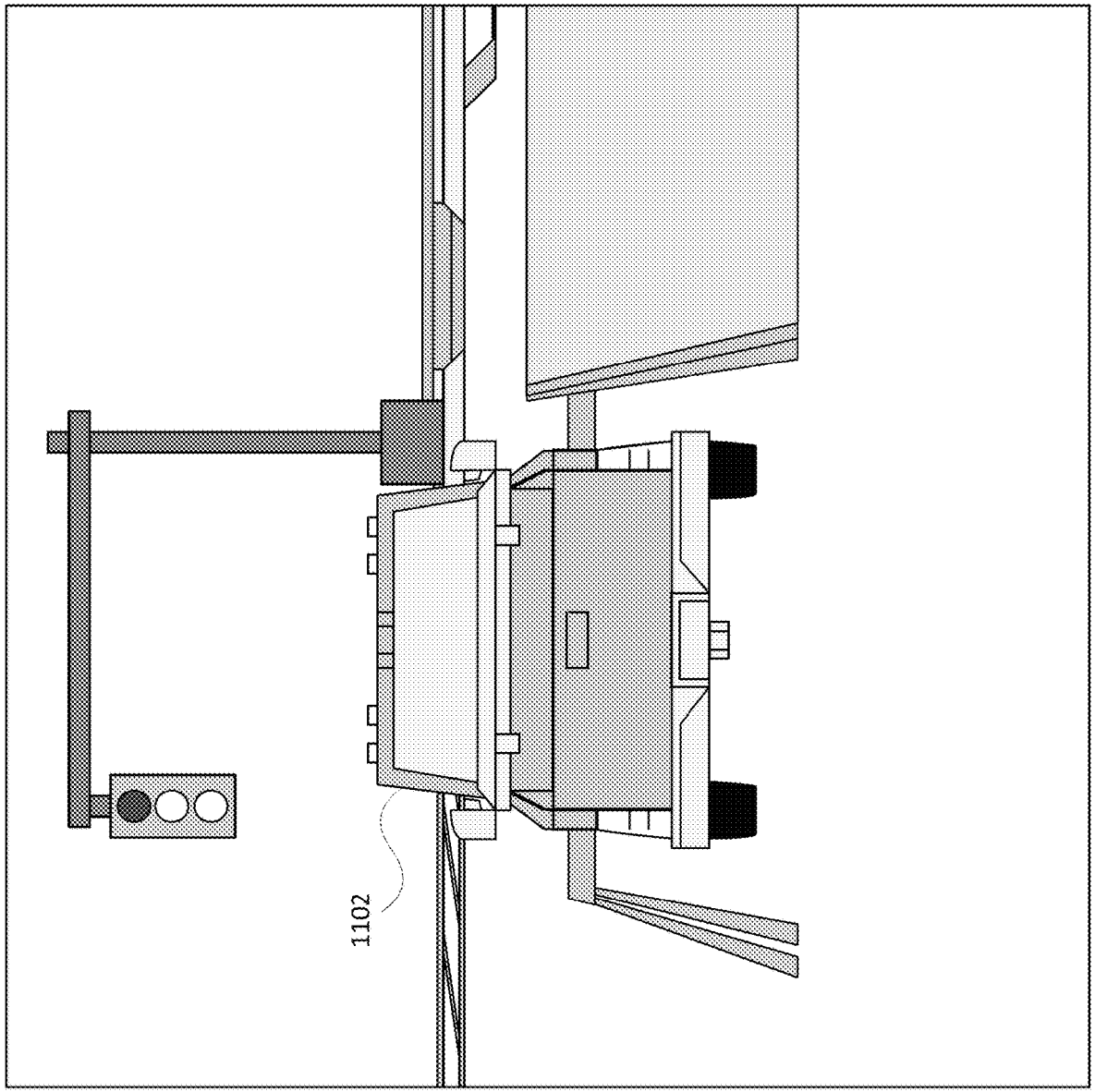
FIGS. 11A-C illustrate another enhanced field of view scenario in accordance with aspects of the disclosure.
Figure 11B:
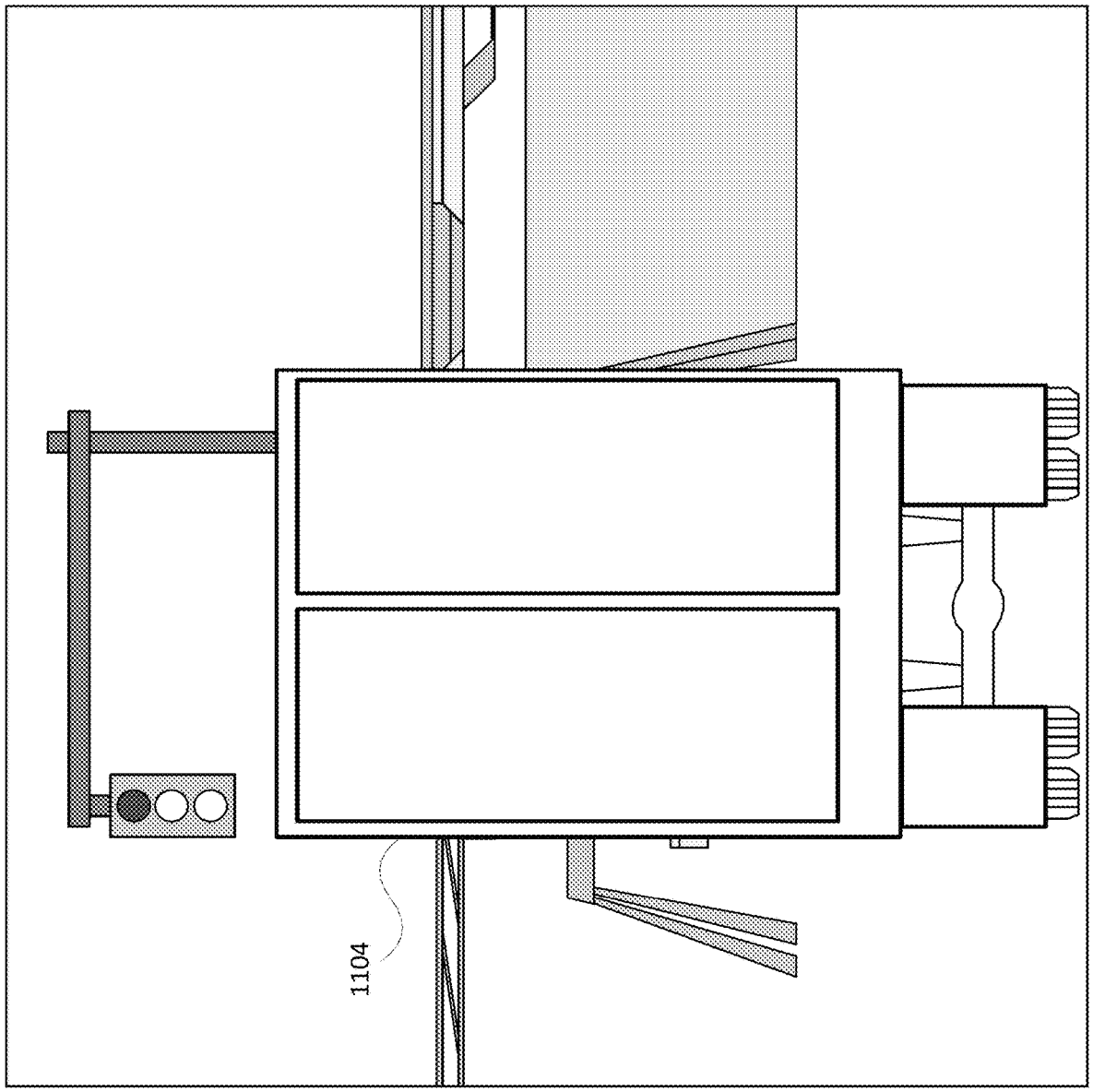
Figure 11C:
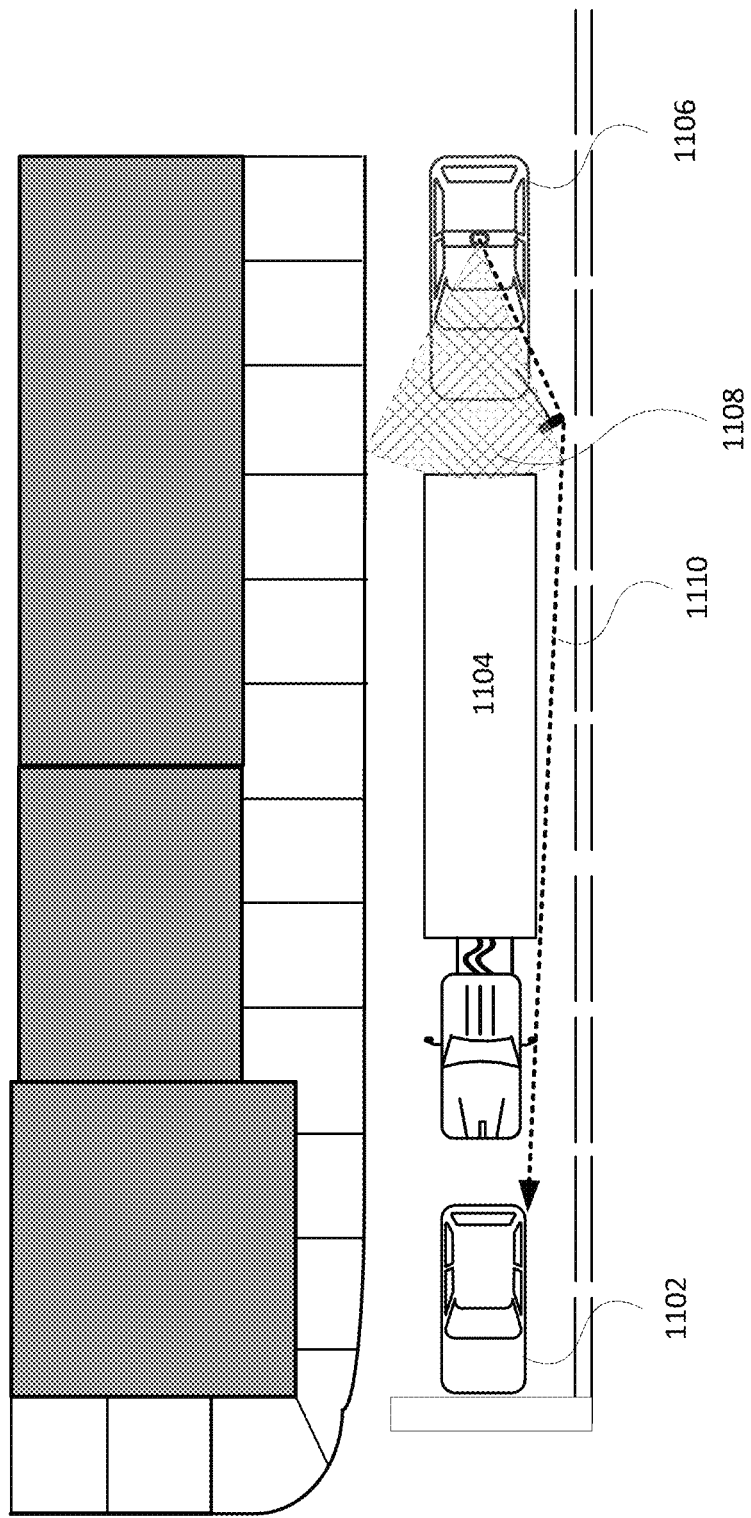

FIGS. 11A-C illustrate a further example 1100. Here, as shown in FIG. 11A, a first vehicle 1102 may be waiting at a stop light. Another vehicle, such as a cargo truck 1104, may stop behind the first vehicle 1102. Due to the size of the truck, the first vehicle may be partly or entirely obscured from view for a vehicle positioned behind the truck. For instance, FIG. 11C illustrates a third vehicle 1106, e.g., a passenger vehicle such as a sedan or minivan, having a sensor FOV 1108. Here, any of the mirror configurations described above may be employed to redirect laser light (or RF waves, optical or infrared imagery, etc.) to enhance the sensor's FOV, as shown by dotted line 1110.

The mirrors may be front surface mirrors (with the reflective surface being above a backing), and may be flat. There should be minimal or no refraction effect in a secondary (e.g., rear) surface of the mirror. Each mirror can be of any size or shape. For instance, a mirror may be rectangular, circular or oval in shape, and range in size from a few square centimeters to one square meter or more. In one scenario, the size of a mirror may be the FOV range times the distance from the lidar to the mirror. Given both values are typically small, the size of mirror may be in tens of centimeters. If multiple mirrors are used, they do not need to be the same size.

Various issues may impact the quality of the information provided by employing redirecting mirrors. For instance, the size, shape and/or distance of the mirror from the sensor impacts the size or resolution of the objects that can the detected. Wind drag, vibration, bugs, dirt, condensation, frost and other factors may also affect the quality of the received information. Thus, a cleaning system may be employed to remove or reduce debris. The cleaning system may include a heater element to eliminate condensation or frost.

As noted above, multiple mirrors may be employed to redirect the beams. This could be done with either coplanar mirrors or non-coplanar mirrors. Vibration and other issues may be more pronounced when there are multiple mirrors involved. A calibration system (e.g., using cameras) could account for mirror movement due to vibration or wind drag.

For instance, an onboard camera of the perception system or other system of the vehicle can be used to measure the angular position of the mirror constantly during operation. Information about the mirror's angular position may be employed as part of a mirror reflection model, which is used in an overall sensor calibration process.

In one scenario, the calibration process determines an extrinsic matrix C. Here, the vehicle may drive for several miles (or more or less), collecting a series of data (e.g., pose and a lidar point set). Then the system solves for the extrinsic matrix C so that when transforming every lidar point set to the world coordinate system, different lidar point sets should be well aligned at overlapped parts. In order to help determine the extrinsic matrix C, small fiducial markers could be added on or incorporated into the mirror surface that can be seen in a small portion of the laser beams hitting the mirror. The measurements from the markers can used to accurately determine the position and orientation relative to sensor. For any laser point p in the laser framework. $C*p$ is its coordinates in the world coordinate system. For laser points that are reflected, a reflection matrix $R_i$ (i is the index of mirror) is needed so that for any reflected laser point p in the laser framework, $R_i*p$ is its real position in the laser framework. Therefore, for all the reflected laser point p in the laser framework, $C*R_i*p$ is its real position in the world coordinate system.

There are two ways of computing $(C*R_i)$, which is the extrinsic matrix for reflected laser points. One way treats the approach as a normal calibration task, but selects out only reflected points. In this way, the system can directly determine $C*R_i$. In the other way, the system measures all necessary geometry information of the vehicle and the mirror, e.g. normal direction, positions of the laser and the mirror. $R_i$ is computed based on this measured information. For instance, given the pose of the vehicle and the extrinsic matrix, the system can compute a transform matrix T which transforms any laser point in the lidar local coordinate system to the world system (lat/long or smooth coordinates). $T=L*C$, where L is a localization matrix, and C is the extrinsic matrix. L changes with the vehicle pose, while C is a constant matrix which the calibration process is aiming at.

To simplify the process, when calibrating the extrinsic matrix for reflected points, the system may only need to collect the lidar points shot into the mirror, and feed that information into the process described above.

In some scenarios, a non-planer mirror could be employed to detect whether there is an object in a general vicinity, although it may be difficult to determine exactly where the object is or the particular type of object. For instance, this might approach may be beneficial with a detector located on the underside of the vehicle, which can be used to determine that a region beneath or adjacent to the vehicle is clear before the vehicle starts moving. In one scenario, one or more mirrors may be curved. For example, a convex mirror may be used to expand the field of view and a concave mirror to contract the field of view. For a non-flat (e.g., convex or concave) mirror, the calibration system would calibrate the returned signal from different points on the mirror individually. For instance, a look-up table may be created for laser points reflected from different spots on the mirror. This is similar to storing a high resolution mesh of the mirror surface and computing the reflection transform for each single laser point.

FIG. 12 illustrates an example operational method 1200 for a vehicle configured to operate in an autonomous driving mode according to the above techniques. As shown in block 1202, the method includes receiving obtained sensor data from one or more sensors. One or more processors of the vehicle's control system are configured to receive the obtained sensor data. The sensors may be part of a perception system of the vehicle, and are configured to detect objects in an environment surrounding the vehicle. Each of the sensors is disposed in a respective housing positioned along the vehicle and has a respective field of view. In one example, multiple sensors may be included in the same housing, while in another example different sensors each have their own housing.

At block 1204, reflected signals are received from one or more mirrors remote from the respective housings of the one or more sensors. The mirrors are configured to reflect received signals towards at least one of the one or more sensors to provide an enhanced a sensor field of view. See, e.g., FIG. 11C, including dotted line 1110. Then, at block 1206, a driving system of the vehicle is controlled when operating in the autonomous driving mode. For instance, the processor(s) of the control system may cause the driving system to perform one or more operations in response to the received obtained sensor data and the received reflected signals that provide the enhanced sensor field of view. This may include, e.g., altering a current trajectory of the vehicle by turning or changing lanes, increasing or decreasing speed, performing emergency braking, modifying a planned route, etc.

The above approaches enable the onboard computer system to evaluate lidar and other signals reflected off of one or more mirrors external to a sensor housing. The reflected signals can enhance sensor FOV and reduce blind spots around the vehicle. Such information can be used by the computer system to effectively control the vehicle (e.g., via a planner module of the computer system), for instance by modifying a driving operation, changing a route, or taking other corrective action. Using mirrors in the manners described above enables perception to be more complete and increases the utility of sensors (e.g., more FOV for the same cost). It also allows sensors to be mounted in a potentially better location (e.g., out of harsh areas and other places that may be subject to impact from dirt, debris, etc.). Such approaches also permit the system to redirect and utilize sensor measurements of a spinning laser when it sweeps through areas that does not need sensing, e.g. sensor backside that faces the vehicle, returns from the vehicle or trailer body, and the like.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements. The processes or other operations may be performed in a different order or simultaneously, unless expressly indicated otherwise herein.

The invention claimed is:

1. A method of operating a vehicle in an autonomous driving mode, comprising:
   receiving, by one or more processors of a control system of the vehicle, sensor data obtained from one or more sensors of a perception system of the vehicle;
   detecting, by the one or more processors, a blockage or a change in a field of view of the one or more sensors in an area around the vehicle due to an intervening object;
   in response to detecting the blockage or the change in the field of view due to the intervening object, obtaining, by the one or more processors, sensor data of reflected signals from one or more mirrors along the vehicle, the one or more mirrors being configured to reflect received signals towards at least one of the one or more sensors to provide an enhanced sensor field of view beyond the intervening object; and
   controlling, by the one or more processors, a driving system of the vehicle when operating in the autonomous driving mode, in response to the received sensor data obtained from the one or more sensors and the obtained sensor data of the reflected signals that provides the enhanced sensor field of view associated with the intervening object.

2. The method of claim 1, wherein the vehicle is a first vehicle, and the intervening object is second vehicle that has moved in front of the first vehicle.

3. The method of claim 2, wherein obtaining the sensor data of reflected signals from the one or more mirrors includes adjusting the one or more mirrors to provide the enhanced sensor field of view beyond the second vehicle.

4. The method of claim 3, wherein adjusting the one or more mirrors is performed when the second vehicle has moved between the first vehicle and a given road user.

5. The method of claim 1, wherein obtaining the sensor data of reflected signals from the one or more mirrors includes deploying the one or more mirrors away from a surface of the vehicle during operation of the vehicle in the autonomous driving mode.

6. The method of claim 5, further comprising retracting the one or more mirrors onto or into the vehicle when not being used to provide the enhanced sensor field of view.

7. The method of claim 1, further comprising calibrating the one or more mirrors prior to or during operation in the autonomous driving mode.

8. The method of claim 1, further comprising:
   detecting an amount of vibration for the one or more mirrors; and
   providing information regarding the detected amount of vibration to the perception system or the control system during processing of the obtained sensor data.

9. A vehicle configured to operate in an autonomous driving mode, comprising:
   a driving system including a steering subsystem, an acceleration subsystem and a deceleration subsystem to control driving of the vehicle in the autonomous driving mode;
   a perception system including one or more sensors configured to detect objects in an environment surrounding the vehicle based on obtained sensor data, each of the one or more sensors being disposed in a respective housing positioned along the vehicle;
   one or more mirrors configured to reflect received signals towards at least one of the one or more sensors to enhance a sensor field of view around the vehicle; and
   a control system operatively connected to the driving system and the perception system, the control system having one or more processors configured to:
      receive the sensor data obtained from one or more sensors of the perception system;
      detect a blockage or a change in a field of view of the one or more sensors in an area around the vehicle due to an intervening object;
      in response to detection of the blockage or the change in the field of view due to the intervening object, obtain sensor data of reflected signals from the one or more mirrors; and
      control the driving system of the vehicle when operating in the autonomous driving mode, in response to the sensor data obtained from the one or more sensors and the sensor data of the reflected signals.

10. The vehicle of claim 9, wherein the one or more processors are configured to obtain the sensor data of reflected signals from the one or more mirrors via adjustment of the one or more mirrors to provide the enhanced sensor field of view beyond the intervening object.

11. The vehicle of claim 9, wherein the one or more processors are configured to obtain the sensor data of reflected signals from the one or more mirrors via deployment of the one or more mirrors away from a surface of the vehicle during operation of the vehicle in the autonomous driving mode.

12. The vehicle of claim 11, wherein the one or more processors are further configured to cause retraction of the one or more mirrors onto or into the vehicle when not being used to provide the enhanced sensor field of view.

13. The vehicle of claim 9, wherein the one or more processors are further configured to calibrate the one or more mirrors prior to or during operation in the autonomous driving mode.

14. A method of operating a vehicle in an autonomous driving mode, comprising:
   receiving, by one or more processors of a control system of the vehicle, sensor data obtained from one or more sensors of a perception system of the vehicle;
   identifying a field of view limitation adjacent to a side of the vehicle associated with a given one of the one or more sensors of the perception system;
   in response to the identified field of view limitation of the given sensor, obtaining, by the one or more processors, sensor data of reflected signals from one or more mirrors arranged along a surface of the vehicle, the one or more mirrors being configured to reflect received signals towards at least one of the one or more sensors to enhance the field of view of the given sensor; and
   controlling, by the one or more processors, a driving system of the vehicle when operating in the autonomous driving mode, in response to the received sensor data obtained from the one or more sensors and the obtained sensor data of the reflected signals that provides the enhanced sensor field of view.

15. The method of claim 14, wherein obtaining the sensor data of reflected signals from the one or more mirrors includes adjusting the one or more mirrors to provide the enhanced sensor field of view.

16. The method of claim 14, wherein obtaining the sensor data of reflected signals from the one or more mirrors includes deploying the one or more mirrors away from a surface of the vehicle during operation of the vehicle in the autonomous driving mode.

17. The method of claim 16, further comprising retracting the one or more mirrors onto or into the vehicle when not being used to provide the enhanced sensor field of view.

18. The method of claim 14, further comprising calibrating the one or more mirrors prior to or during operation in the autonomous driving mode.

19. The method of claim 14, further comprising dampening vibration of the one or more mirrors during operation in the autonomous driving mode.

20. A vehicle configured to operate in an autonomous driving mode, comprising:
   a driving system including a steering subsystem, an acceleration subsystem and a deceleration subsystem to control driving of the vehicle in the autonomous driving mode;
   a perception system including one or more sensors configured to detect objects in an environment surrounding the vehicle based on obtained sensor data, each of the one or more sensors being disposed in a respective housing positioned along the vehicle;
   one or more mirrors configured to reflect received signals towards at least one of the one or more sensors to enhance a sensor field of view around the vehicle; and
   a control system operatively connected to the driving system and the perception system, the control system having one or more processors configured to:
      receive sensor data obtained from the one or more sensors of the perception system;
      identify a field of view limitation adjacent to a side of the vehicle associated with a given one of the one or more sensors of the perception system;
      in response to the identified field of view limitation of the given sensor, obtain sensor data of reflected signals from the one or more mirrors; and
      control the driving system of the vehicle when operating in the autonomous driving mode, in response to the received sensor data obtained from the one or more sensors and the obtained sensor data of the reflected signals.

* * * * *